United States Patent
Zhu et al.

(10) Patent No.: US 12,073,261 B2
(45) Date of Patent: Aug. 27, 2024

(54) SYNCHRONIZATION METHOD AND APPARATUS

(71) Applicant: Huawei Technologies Co., Ltd., Shenzhen (CN)

(72) Inventors: Xiangyi Zhu, Shanghai (CN); Hou Fun Lam, Hong Kong (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/477,117

(22) Filed: Sep. 28, 2023

(65) Prior Publication Data

US 2024/0028423 A1  Jan. 25, 2024

Related U.S. Application Data

(63) Continuation of application No. PCT/CN2021/084747, filed on Mar. 31, 2021.

(51) Int. Cl.
*G06F 9/46* (2006.01)
*G06F 9/52* (2006.01)

(52) U.S. Cl.
CPC ..................................... *G06F 9/52* (2013.01)

(58) Field of Classification Search
CPC .......................................................... G06F 9/52
See application file for complete search history.

(56) References Cited

U.S. PATENT DOCUMENTS

| 2013/0152103 A1* | 6/2013 | Jea ........................... G06F 9/522 718/104 |
| 2020/0073830 A1* | 3/2020 | Verrilli ................... G06N 3/105 |
| 2020/0210248 A1 | 7/2020 | Dupont De Dinechin et al. |
| 2021/0064425 A1 | 3/2021 | Li et al. |

OTHER PUBLICATIONS

Fei Chen et al., "HPP controller: a system controller for high performance computing," Front. Comput. Sci. China, vol. 4, No. 4, DOI 10.1007/s11704-010-0382-y, Dec. 2010, 10 pages.

* cited by examiner

*Primary Examiner* — Gregory A Kessler
(74) *Attorney, Agent, or Firm* — Conley Rose, P.C.

(57) ABSTRACT

In a synchronization method, a first processor creates a first synchronization object for a first synchronization event. The first synchronization object includes an identifier of a first synchronization register. A value of the first synchronization register includes a first value or a second value. The first value is used to indicate that the first synchronization event does not occur, and the second value is used to indicate that the first synchronization event occurs. The first processor includes a first CPU. The second processor determines, based on the value of the first synchronization register, whether the first synchronization event occurs. The second processor includes a first NPU.

20 Claims, 23 Drawing Sheets

TO

TO

CONT.
FROM

| GPU 0 | $a_1+a_0+a_2+a_3+a_4$ | $b_2+b_1+b_3+b_4+b_0$ | $c_3+c_2+c_4+c_0+c_1$ | $d_4+d_3+d_0+d_1+d_2$ | $e_0+e_4+e_1+e_2+e_3$ |
| GPU 1 | $a_1+a_0+a_2+a_3+a_4$ | $b_2+b_1+b_3+b_4+b_0$ | $c_3+c_2+c_4+c_0+c_1$ | $d_4+d_3+d_0+d_1+d_2$ | $e_0+e_4+e_1+e_2+e_3$ |
| GPU 2 | $a_1+a_0+a_2+a_3+a_4$ | $b_2+b_1+b_3+b_4+b_0$ | $c_3+c_2+c_4+c_0+c_1$ | $d_4+d_3+d_0+d_1+d_2$ | $e_0+e_4+e_1+e_2+e_3$ |
| GPU 3 | $a_1+a_0+a_2+a_3+a_4$ | $b_2+b_1+b_3+b_4+b_0$ | $c_3+c_2+c_4+c_0+c_1$ | $d_4+d_3+d_0+d_1+d_2$ | $e_0+e_4+e_1+e_2+e_3$ |
| GPU 4 | $a_1+a_0+a_2+a_3+a_4$ | $b_2+b_1+b_3+b_4+b_0$ | $c_3+c_2+c_4+c_0+c_1$ | $d_4+d_3+d_0+d_1+d_2$ | $e_0+e_4+e_1+e_2+e_3$ |

SYNCHRONIZATION METHOD AND APPARATUS

CROSS-REFERENCE TO RELATED APPLICATIONS

This is a continuation of Int'l Patent App. No. PCT/CN2021/084747, filed on Mar. 31, 2021, which is incorporated by reference.

FIELD

Embodiments of this disclosure relate to the field of artificial intelligence, furthermore, to a synchronization method and apparatus.

BACKGROUND

In an artificial intelligence (AI) scenario, high computing power is usually required. Computing power of a single AI accelerator (for example, a neural processing unit (NPU)) or a single AI server (for example, an AI server including a plurality of AI accelerators) is limited and therefore cannot meet a computing power requirement in the AI scenario. Therefore, a plurality of AI servers are required to form a cluster to provide the computing power required in the AI scenario. When the plurality of AI servers form the cluster to perform AI training, it is necessary to provide an appropriate synchronization mechanism to reduce synchronization transmission and synchronization waiting time in an AI accelerator, between different AI accelerators in an AI server, and between AI servers.

SUMMARY

Embodiments provide a synchronization method and apparatus, to implement synchronization in an AI accelerator, between different AI accelerators in an AI server, and between AI servers.

To achieve the foregoing objectives, the following technical solutions are used in the embodiments.

According to a first aspect, a synchronization method is provided. The method includes: A first processor creates a first synchronization object for a first synchronization event. The first synchronization object includes an identifier of a first synchronization register. A value of the first synchronization register includes a first value or a second value. The first value is used to indicate that the first synchronization event does not occur, and the second value is used to indicate that the first synchronization event occurs. A second processor determines, based on the value of the first synchronization register, whether the first synchronization event occurs.

In some embodiments, the first processor includes a first central processing unit CPU, and the second processor includes a first neural-network processing unit NPU. For example, the first processor may be a CPU in an AI server, and the second processor may be an AI accelerator in the AI server. The CPU and the AI accelerator are located in the same AI server. The second processor is an AI accelerator waiting for the first synchronization event to occur.

In some embodiments, the first synchronization event may occur in an NPU, or may occur between different NPUs in an AI server, or may occur between different AI servers.

Based on this solution, a synchronization object is created for a synchronization event, and each synchronization object corresponds to one synchronization register, so that the AI accelerator may determine, based on a value of the synchronization register, whether a synchronization event corresponding to the synchronization register occurs. In this way, synchronization in an AI accelerator, between different AI accelerators in an AI server, and between AI servers can be implemented.

With reference to the first aspect, in a possible implementation, that a first processor creates a first synchronization object for a first synchronization event includes: The first processor allocates the first synchronization register in a plurality of synchronization registers included in the second processor to the first synchronization event by invoking a first application programming interface (API), and stores the identifier of the first synchronization register in the first synchronization object.

In some embodiments, the first API is configured to create the synchronization object for the synchronization event. The first API may be NotifyCreat (deviceID, notify), where an input deviceID is an ID of the AI accelerator, an output notify is the synchronization object, and the NotifyCreat interface is configured to create the synchronization object. The deviceID is the ID of the AI accelerator waiting for the synchronization event to occur.

Based on this solution, a group of synchronization registers are disposed in the AI accelerator, so that when synchronization needs to be performed, the CPU may allocate, to the first synchronization event, the first synchronization register in the plurality of synchronization registers included in the AI accelerator waiting for the synchronization event to occur. In this way, once the value of the first synchronization register changes, the AI accelerator may immediately detect the change in the value of the first synchronization register, and can relatively quickly determine whether the first synchronization event occurs. In this way, synchronization in an AI accelerator, between different AI accelerators in an AI server, and between different AI servers is implemented. In addition, the API interface provided in the solution in this embodiment is relatively simple, and synchronization overheads are relatively small. Therefore, AI training efficiency can be improved.

With reference to the first aspect and the foregoing possible implementation, in another possible implementation, the method further includes: The first processor sends a wait task corresponding to the first synchronization event to the second processor by invoking a second API. The wait task corresponding to the first synchronization event is used to wait for the first synchronization event to occur, and the wait task corresponding to the first synchronization event includes a first queue identifier and the identifier of the first synchronization register. The first queue identifier is an identifier of a queue in which the wait task is located. The second processor receives the wait task corresponding to the first synchronization event.

Based on this solution, the CPU may deliver, to the AI accelerator by using a simple API, the wait task used to wait for the synchronization event to occur, and add the identifier of the synchronization register to the wait task, so that the AI accelerator may determine, based on different values of the synchronization register, whether the synchronization event occurs. In this way, synchronization in an AI accelerator, between different AI accelerators in an AI server, and between AI servers can be implemented.

In some embodiments, the second API is configured to deliver the wait task corresponding to the synchronization event. The second API may be a NotifyWait (notify, stream)

interface, and the interface is configured to wait for, in the stream, a synchronization event corresponding to a synchronization object to occur.

With reference to the first aspect and the foregoing possible implementations, in another possible implementation, that a second processor determines, based on the value of the first synchronization register, whether the first synchronization event occurs includes: When the value of the first synchronization register is the first value, the second processor determines that the first synchronization event does not occur. The second processor continues to wait for the first synchronization event to occur. Until the value of the first synchronization register is the second value, the second processor determines that the first synchronization event occurs. The second processor resets the value of the first synchronization register to the first value.

Based on this solution, when the first synchronization event does not occur, the AI accelerator may wait for the first synchronization event to occur until the first synchronization event occurs, then reset the value of the first synchronization register to the first value, and continue to execute a subsequent task. In this way, synchronization in an AI accelerator, between different AI accelerators in an AI server, and between different AI servers can be implemented.

It may be understood that when the first synchronization event occurs, the value of the first register changes from the first value to the second value. Because the first synchronization register is a synchronization register in the second processor, a controller of the second processor may immediately detect the change in the value of the first synchronization register, and the second processor determines that the first synchronization event occurs. The second processor resets the value of the first synchronization register to the first value, so that the first synchronization register may continue to perform a synchronization operation.

With reference to the first aspect and the foregoing possible implementations, in another possible implementation, that a second processor determines, based on the value of the first synchronization register, whether the first synchronization event occurs further includes: When the value of the first synchronization register is the second value, the second processor determines that the first synchronization event occurs, and the second processor resets the value of the first synchronization register to the first value.

Based on this solution, when the second processor detects that the value of the first synchronization register is the second value, the second processor determines that the first synchronization event occurs, and the second processor resets the value of the first synchronization register to the first value. Then, the second processor may continue to execute the subsequent task. In this way, correct synchronization can be ensured, and synchronization in an AI accelerator, between different AI accelerators in an AI server, and between different AI servers can be implemented.

With reference to the first aspect and the foregoing possible implementations, in another possible implementation, the method further includes: The first processor sends a record task corresponding to the first synchronization event to the second processor by invoking a third API. The record task corresponding to the first synchronization event is used to indicate that the first synchronization event occurs, and the record task corresponding to the first synchronization event includes a second queue identifier and the identifier of the first synchronization register. The second queue identifier is an identifier of a queue in which the record task corresponding to the first synchronization event is located. The second processor receives the record task corresponding to the first synchronization event, and resets the value of the first synchronization register to the second value based on the identifier of the first synchronization register.

Based on this solution, the CPU may deliver, to the AI accelerator (the second processor) by using a simple API, the record task used to indicate that the synchronization event occurs, and add the identifier of the synchronization register to the wait task, so that the AI accelerator writes the second value based on the identifier of the synchronization register. In this way, the value of the synchronization register may correspond to an occurrence status of the first synchronization event. The first synchronization register is a synchronization register in the second processor. Therefore, the controller of the second processor may immediately detect the change in the value of the first synchronization register, and the second processor determines that the first synchronization event occurs, so that the second processor may continue to execute the subsequent task, to ensure correct synchronization in the second processor.

In some embodiments, the third API is configured to deliver the record task corresponding to the synchronization event. The third API may be a NotifyRecord (notify, stream) interface, and the interface is configured to set occurrence of the synchronization event corresponding to the synchronization object in the stream.

In some embodiments, when the first synchronization event occurs in an AI accelerator, the second processor executes both the wait task and the record task. When the second processor executes both the wait task and the record task, the wait task and the record task may be tasks in two streams respectively.

In some embodiments, when the first synchronization event occurs between two AI accelerators in an AI server, the second processor executes the wait task, and a third processor executes the record task.

With reference to the first aspect and the foregoing possible implementations, in another possible implementation, the method further includes: The first processor sends a record task corresponding to the first synchronization event to the third processor by invoking a third API. The record task corresponding to the first synchronization event is used to indicate that the first synchronization event occurs, and the record task corresponding to the first synchronization event includes a second queue identifier and the identifier of the first synchronization register. The second queue identifier is an identifier of a queue in which the record task corresponding to the first synchronization event is located. The third processor includes a second NPU. The third processor receives the record task corresponding to the first synchronization event, and resets the value of the first synchronization register to the second value based on the identifier of the first synchronization register.

In some embodiments, the third processor and the second processor may be different NPUs in an AI server.

Based on this solution, the CPU may deliver, to the AI accelerator (the third processor) by using a simple API, the record task used to indicate that the synchronization event occurs, and add the identifier of the synchronization register to the wait task, so that the AI accelerator writes the second value based on the identifier of the synchronization register. In this way, the value of the synchronization register may correspond to an occurrence status of the first synchronization event. The first synchronization register is a synchronization register in the second processor. Therefore, the controller of the second processor may immediately detect the change in the value of the first synchronization register, and the second processor determines that the first synchronization event occurs, so that the second processor may continue to execute the subsequent task, to ensure correct synchronization between the second processor and the third processor in the AI server.

It may be understood that in the synchronization method provided in this solution, synchronization overheads are overheads of writing the register by the controller of the AI accelerator through a bus, and the synchronization overheads are relatively small. For example, by using the synchronization method provided in this solution, synchronization overheads of synchronization in an NPU are less than 50 ns, and synchronization overheads of synchronization between different NPUs in an AI server are less than 1 microseconds (µs). In addition, a simple API interface is provided in this solution, and the interface is similar to a semaphore interface of a general OS and can greatly facilitate a developer to use the AI accelerator.

With reference to the first aspect and the foregoing possible implementations, in another possible implementation, if the first synchronization event is an inter-process synchronization event, the method further includes: The first processor sets a name of the first synchronization object to a preset name by invoking a fourth API of a first application. The first processor obtains the identifier of the first synchronization register corresponding to the preset name by invoking a fifth API of a second application.

Based on this solution, if the synchronization event is an inter-process synchronization event, a global name of the synchronization object is preset, so that the synchronization object between different processes can correspond to the same synchronization register. Then, inter-process synchronization can be implemented by invoking the second API and the third API.

In some embodiments, the fourth API is configured to set the global name of the synchronization object. The fourth API may be IpcSetNotifyName (notify, name), and is configured to set a global name of a synchronization object notify. The fifth API is configured to obtain the identifier of the register corresponding to the preset name. The fifth API may be IpcOpenNotify (notify, name), and is configured to open the synchronization object notify based on a global name of the synchronization object.

With reference to the first aspect and the foregoing possible implementations, in another possible implementation, the first synchronization event is a synchronization event between the first application and the second application, and the preset name is a name agreed upon in advance by the first application and the second application.

Based on this solution, when the synchronization event is for inter-process synchronization, the global name of the synchronization object is preset by different applications, so that the synchronization object between different processes can correspond to the same synchronization register, to implement inter-process synchronization.

In some embodiments, regardless of whether the first synchronization event is a synchronization event of an APP or a synchronization event between a plurality of APPs, the first synchronization event may occur in an AI accelerator, or may occur between different AI accelerators in an AI server.

With reference to the first aspect and the foregoing possible implementations, in another possible implementation, the method further includes: The first processor obtains a virtual address of a second synchronization register by invoking a sixth API. The second synchronization register is a register corresponding to a second synchronization event. Different values of the second synchronization register are used to indicate whether the second synchronization event occurs. The first processor sends the virtual address of the second synchronization register to a fourth processor. The first processor and the fourth processor are processors in different AI servers, and the fourth processor includes a second CPU.

In some embodiments, the first processor and the fourth processor may be CPUs in two AI accelerators respectively.

Based on this solution, a physical address of the synchronization register is converted into the virtual address, so that a value is written to the synchronization register corresponding to the virtual address, to indicate that the synchronization event occurs, so as to implement synchronization between the AI accelerators. In addition, when synchronization between AI servers is performed in this solution, synchronization overheads are only time overheads of network communication, and there is no other additional overhead. Therefore, the synchronization overheads are relatively small. In addition, a simple API interface is provided in this embodiment, and the interface is similar to a semaphore interface of a general OS and greatly facilitates the developer to use the AI accelerator.

In some embodiments, the sixth API is configured to obtain the virtual address of the register corresponding to the synchronization object. The sixth API may be NotifyGetAddr (notify, addr), where an input is the synchronization object notify, and an output is a virtual address of a synchronization register corresponding to the synchronization object notify.

With reference to the first aspect and the foregoing possible implementations, in another possible implementation, the method further includes: The first processor invokes a seventh API to release a correspondence between the first synchronization register and the first synchronization event, and reset the value of the first synchronization register to the first value. The seventh API is configured to release the first synchronization register.

Based on this solution, the correspondence between the first synchronization register and the first synchronization event is released, so that the first synchronization register may be recycled. In this way, when synchronization needs to be performed subsequently, the synchronization register may be allocated to another synchronization object, to improve utilization of the synchronization register.

In some embodiments, the seventh API is configured to release the first synchronization register. The seventh API may be NotifyDestroy (notify), and the interface may be configured to destroy the synchronization object notify, and release the synchronization register corresponding to the synchronization object.

With reference to the first aspect and the foregoing possible implementations, in another possible implementation, the physical address of the first synchronization register is addressed in a global addressing manner.

Based on this solution, the synchronization register is addressed in the global addressing manner, so that a controller of each AI accelerator may learn a physical address of a synchronization register in another AI accelerator in the AI server, and may also access the synchronization register of the another AI accelerator by using the physical address. In this way, synchronization in the AI accelerator and between the AI accelerators can be implemented.

According to a second aspect, a synchronization method is provided. The method includes: A fourth processor receives a virtual address of a second synchronization register from a first processor. The second synchronization register is a register corresponding to a second synchronization event. A value of the second synchronization register includes a first value or a second value. The first value is used to indicate that the second synchronization event does not occur, and the second value is used to indicate that the second synchronization event occurs. The first processor and the fourth processor are processors in different AI servers. The first processor includes a first central processing unit CPU, and the fourth processor includes a second CPU. The fourth processor sends a remote direct memory access RDMA task corresponding to the second synchronization event to a fifth processor. The RDMA task corresponding to the second synchronization event is used to indicate that the second synchronization event occurs, and the RDMA task corresponding to the second synchronization event includes the virtual address of the second synchronization register. The fifth processor receives the RDMA task corresponding to the second synchronization event, and resets the value of the second synchronization register to the second value based on the virtual address of the second synchronization register through an RDMA apparatus. The fifth processor includes a third NPU.

In some embodiments, the first processor and the fourth processor may be CPUs in different AI accelerators respectively. The fourth processor and the fifth processor are different processors in a same AI accelerator. For example, the fourth processor is a CPU in the AI accelerator, and the fifth processor is an NPU in the AI accelerator.

Based on this solution, an AI accelerator in an AI server obtains a virtual address of a synchronization register, so that when a synchronization event occurs, the AI accelerator may write a value to the synchronization register corresponding to the virtual address through an RDMA apparatus, to indicate that the synchronization event occurs. In this way, an AI accelerator in another AI server can immediately detect a change in a value of the synchronization register, and determine that the synchronization event occurs. Therefore, synchronization between different AI accelerators can be implemented.

In some embodiments, the fourth processor may send the RDMA task corresponding to the second synchronization event to the fifth processor by invoking an eighth API. The eighth API is configured to deliver the RDMA task corresponding to the synchronization event. The eighth API may be RDMAsend (addr, 1), and is configured to indicate to write a second value 1 to a virtual address addr.

According to a third aspect, a synchronization method is provided. The method includes: A fourth processor receives a virtual address of a second synchronization register from a first processor. The second synchronization register is a register corresponding to a second synchronization event. A value of the second synchronization register includes a first value or a second value. The first value is used to indicate that the second synchronization event does not occur, and the second value is used to indicate that the second synchronization event occurs. The first processor and the fourth processor are processors in different AI servers. The first processor includes a first central processing unit CPU, and the fourth processor includes a second CPU. The fourth processor resets the value of the second synchronization register to the second value based on the virtual address of the second synchronization register through a remote direct memory access RDMA apparatus.

In some embodiments, the first processor and the fourth processor may be CPUs in two AI accelerators respectively.

Based on this solution, a CPU in an AI server obtains a virtual address of a synchronization register, so that when a synchronization event occurs, the CPU may write a value to the synchronization register corresponding to the virtual address through RDMA, to indicate that the synchronization event occurs. In this way, an AI accelerator in another AI server can immediately detect a change in a value of the synchronization register, and determine that the synchronization event occurs. Therefore, synchronization between different AI accelerators can be implemented.

According to a fourth aspect, a synchronization apparatus is provided. The synchronization apparatus includes a second processor. The second processor includes a plurality of synchronization registers. Each synchronization register is configured to correspond to one synchronization event, and a value of each synchronization register includes a first value or a second value. The first value is used to indicate that the synchronization event corresponding to the synchronization register does not occur, and the second value is used to indicate that the synchronization event corresponding to the synchronization register occurs. The second processor includes a first neural-network processing unit NPU.

With reference to the fourth aspect, in a possible implementation, the synchronization apparatus further includes a first processor, where the first processor is configured to create a first synchronization object for a first synchronization event, the first synchronization object includes an identifier of a first synchronization register, and different values of the first synchronization register are used to indicate whether the first synchronization event occurs; and a second processor configured to determine, based on the value of the first synchronization register, whether the first synchronization event occurs, where the first processor includes a first central processing unit CPU.

With reference to the fourth aspect and the foregoing possible implementation, in another possible implementation, the first processor is configured to: allocate the first synchronization register in the plurality of synchronization registers included in the second processor to the first synchronization event by invoking a first API, and store the identifier of the first synchronization register in the first synchronization object.

With reference to the fourth aspect and the foregoing possible implementations, in another possible implementation, the first processor is further configured to send a wait task corresponding to the first synchronization event to the second processor by invoking a second API. The wait task corresponding to the first synchronization event is used to wait for the first synchronization event to occur, and the wait task corresponding to the first synchronization event includes a first queue identifier and the identifier of the first synchronization register. The first queue identifier is an identifier of a queue in which the wait task is located. The second processor is further configured to receive the wait task corresponding to the first synchronization event.

With reference to the fourth aspect and the foregoing possible implementations, in another possible implementation, the second processor is configured to: when the value of the first synchronization register is the first value, determine that the first synchronization event does not occur. The second processor continues to wait for the first synchronization event to occur. Until the value of the first synchronization register is the second value, the second processor determines that the first synchronization event occurs, and resets the value of the first synchronization register to the first value.

With reference to the fourth aspect and the foregoing possible implementations, in another possible implementation, the second processor is further configured to: when the value of the first synchronization register is the second value, determine that the first synchronization event occurs, and reset the value of the first synchronization register to the first value.

With reference to the fourth aspect and the foregoing possible implementations, in another possible implementation, the first processor is further configured to send a record task corresponding to the first synchronization event to the second processor by invoking a third API. The record task corresponding to the first synchronization event is used to indicate that the first synchronization event occurs, and the record task corresponding to the first synchronization event includes a second queue identifier and the identifier of the first synchronization register. The second queue identifier is an identifier of a queue in which the record task corresponding to the first synchronization event is located. The second processor is further configured to receive the record task corresponding to the first synchronization event, and reset the value of the first synchronization register to the second value based on the identifier of the first synchronization register.

With reference to the fourth aspect and the foregoing possible implementations, in another possible implementation, the synchronization apparatus further includes a third processor, and the third processor includes a second NPU. The first processor is further configured to send a record task corresponding to the first synchronization event to the third processor by invoking a third API. The record task corresponding to the first synchronization event is used to indicate that the first synchronization event occurs, and the record task corresponding to the first synchronization event includes a second queue identifier and the identifier of the first synchronization register. The second queue identifier is an identifier of a queue in which the record task corresponding to the first synchronization event is located. The third processor is configured to receive the record task corresponding to the first synchronization event, and reset the value of the first synchronization register to the second value based on the identifier of the first synchronization register.

With reference to the fourth aspect and the foregoing possible implementations, in another possible implementation, if the first synchronization event is an inter-process synchronization event, the first processor is further configured to set a name of the first synchronization object to a preset name by invoking a fourth API of a first application. The first processor is further configured to obtain the identifier of the first synchronization register corresponding to the preset name by invoking a fifth API of a second application.

With reference to the fourth aspect and the foregoing possible implementations, in another possible implementation, the first synchronization event is a synchronization event between the first application and the second application, and the preset name is a name agreed upon in advance by the first application and the second application.

With reference to the fourth aspect and the foregoing possible implementations, in another possible implementation, the first processor is further configured to obtain a virtual address of a second synchronization register by invoking a sixth API. The second synchronization register is a register corresponding to a second synchronization event. Different values of the second synchronization register are used to indicate whether the second synchronization event occurs. The first processor is further configured to send the virtual address of the second synchronization register to a fourth processor. The first processor and the fourth processor are processors in different AI servers, and the fourth processor includes a second CPU.

With reference to the fourth aspect and the foregoing possible implementations, in another possible implementation, the first processor is further configured to invoke a seventh API, to release a correspondence between the first synchronization register and the first synchronization event, and reset the value of the first synchronization register to the first value. The seventh API is configured to release the first synchronization register.

With reference to the fourth aspect and the foregoing possible implementations, in another possible implementation, a physical address of the first synchronization register is addressed in a global addressing manner.

According to a fifth aspect, a synchronization apparatus is provided. The synchronization apparatus includes a fourth processor and a fifth processor. The fourth processor is configured to receive a virtual address of a second synchronization register from a first processor. The second synchronization register is a register corresponding to a second synchronization event. A value of the second synchronization register includes a first value or a second value. The first value is used to indicate that the second synchronization event does not occur, and the second value is used to indicate that the second synchronization event occurs. The first processor and the fourth processor are processors in different AI servers. The first processor includes a first central processing unit CPU, and the fourth processor includes a second CPU. The fourth processor is further configured to send a remote direct memory access RDMA task corresponding to the second synchronization event to the fifth processor. The RDMA task corresponding to the second synchronization event is used to indicate that the second synchronization event occurs, and the RDMA task corresponding to the second synchronization event includes the virtual address of the second synchronization register. The fifth processor includes a third NPU. The fifth processor is configured to: receive the RDMA task corresponding to the second synchronization event, and reset the value of the second synchronization register to the second value based on the virtual address of the second synchronization register through an RDMA apparatus.

In some embodiments, the fourth processor may send the RDMA task corresponding to the second synchronization event to the fifth processor by invoking an eighth API.

According to a sixth aspect, a synchronization apparatus is provided. The synchronization apparatus includes a fourth processor. The fourth processor is configured to receive a virtual address of a second synchronization register from a first processor. The second synchronization register is a register corresponding to a second synchronization event. A value of the second synchronization register includes a first value or a second value. The first value is used to indicate that the second synchronization event does not occur, and the second value is used to indicate that the second synchronization event occurs. The first processor and the fourth processor are processors in different AI servers. The first processor includes a first central processing unit CPU, and the fourth processor includes a second CPU. The fourth processor is further configured to reset the value of the second synchronization register to the second value based on the virtual address of the second synchronization register through a remote direct memory access RDMA apparatus.

For an effect description of the fourth aspect, refer to the effect description of the first aspect. For an effect description of the fifth aspect, refer to the effect description of the second aspect. For an effect description of the sixth aspect, refer to the effect description of the third aspect. Details are not described herein again.

According to a seventh aspect, a first processor is provided. The first processor is configured to create a first synchronization object for a first synchronization event. The first synchronization object includes an identifier of a first synchronization register. A value of the first register includes a first value or a second value. The first value is used to indicate that the synchronization event does not occur, and the second value is used to indicate that the synchronization event occurs. The first processor includes a first central processing unit CPU.

In some embodiments, the first processor is further configured to reset the value of the first register to the first value.

With reference to the seventh aspect, in a possible implementation, the first processor is configured to: allocate the first synchronization register in a plurality of synchronization registers included in a second processor to the first synchronization event by invoking a first API, and store the identifier of the first synchronization register in the first synchronization object.

With reference to the seventh aspect and the foregoing possible implementations, in another possible implementation, the first processor is further configured to send a wait task corresponding to the first synchronization event to the second processor by invoking a second API. The wait task corresponding to the first synchronization event is used to wait for the first synchronization event to occur, and the wait task corresponding to the first synchronization event includes a first queue identifier and the identifier of the first synchronization register. The first queue identifier is an identifier of a queue in which the wait task is located.

With reference to the seventh aspect and the foregoing possible implementations, in another possible implementation, the first processor is further configured to send a record task corresponding to the first synchronization event to the second processor by invoking a third API. The record task corresponding to the first synchronization event is used to indicate that the first synchronization event occurs, and the record task corresponding to the first synchronization event includes a second queue identifier and the identifier of the first synchronization register. The second queue identifier is an identifier of a queue in which the record task corresponding to the first synchronization event is located.

With reference to the seventh aspect and the foregoing possible implementations, in another possible implementation, the first processor is further configured to send a record task corresponding to the first synchronization event to a third processor by invoking a third API. The record task corresponding to the first synchronization event is used to indicate that the first synchronization event occurs, and the record task corresponding to the first synchronization event includes a second queue identifier and the identifier of the first synchronization register. The second queue identifier is an identifier of a queue in which the record task corresponding to the first synchronization event is located.

With reference to the seventh aspect and the foregoing possible implementations, in another possible implementation, if the first synchronization event is an inter-process synchronization event, the first processor is further configured to set a name of the first synchronization object to a preset name by invoking a fourth API of a first application. The first processor is further configured to obtain the identifier of the first synchronization register corresponding to the preset name by invoking a fifth API of a second application.

With reference to the seventh aspect and the foregoing possible implementations, in another possible implementation, the first synchronization event is a synchronization event between the first application and the second application, and the preset name is a name agreed upon in advance by the first application and the second application.

With reference to the seventh aspect and the foregoing possible implementations, in another possible implementation, the first processor is further configured to obtain a virtual address of a second synchronization register by invoking a sixth API. The second synchronization register is a register corresponding to a second synchronization event. Different values of the second synchronization register are used to indicate whether the second synchronization event occurs. The first processor is further configured to send the virtual address of the second synchronization register to a fourth processor. The first processor and the fourth processor are processors in different AI servers, and the fourth processor includes a second CPU.

With reference to the seventh aspect and the foregoing possible implementations, in another possible implementation, the first processor is further configured to invoke a seventh API, to release a correspondence between the first synchronization register and the first synchronization event, and reset the value of the first synchronization register to the first value. The seventh API is configured to release the first synchronization register.

With reference to the seventh aspect and the foregoing possible implementations, in another possible implementation, a physical address of the first synchronization register is addressed in a global addressing manner.

According to an eighth aspect, a second processor is provided. The second processor includes a plurality of synchronization registers. Each synchronization register is configured to correspond to one synchronization event, and a value of each synchronization register includes a first value or a second value. The first value is used to indicate that the synchronization event corresponding to the synchronization register does not occur, and the second value is used to indicate that the synchronization event corresponding to the synchronization register occurs. The second processor includes a first neural-network processing unit NPU.

With reference to the eighth aspect, in a possible implementation, the second processor is configured to determine, based on a value of a first synchronization register, whether a first synchronization event occurs.

With reference to the eighth aspect and the foregoing possible implementation, in another possible implementation, the second processor is configured to: when the value of the first synchronization register is the first value, determine that the first synchronization event does not occur. The second processor continues to wait for the first synchronization event to occur. Until the value of the first synchronization register is the second value, the second processor determines that the first synchronization event occurs, and resets the value of the first synchronization register to the first value.

With reference to the eighth aspect and the foregoing possible implementations, in another possible implementation, the second processor is further configured to: when the value of the first synchronization register is the second value, determine that the first synchronization event occurs, and reset the value of the first synchronization register to the first value.

With reference to the eighth aspect and the foregoing possible implementations, in another possible implementation, the second processor is further configured to receive a wait task corresponding to the first synchronization event. The wait task corresponding to the first synchronization event is used to wait for the first synchronization event to occur, and the wait task corresponding to the first synchronization event includes a first queue identifier and an identifier of the first synchronization register. The first queue identifier is an identifier of a queue in which the wait task is located.

With reference to the eighth aspect and the foregoing possible implementations, in another possible implementation, the second processor is further configured to: receive a record task corresponding to the first synchronization event, and reset the value of the first synchronization register to the second value based on the identifier of the first synchronization register. The record task corresponding to the first synchronization event is used to indicate that the first synchronization event occurs, and the record task corresponding to the first synchronization event includes a second queue identifier and the identifier of the first synchronization register. The second queue identifier is an identifier of a queue in which the record task corresponding to the first synchronization event is located.

According to a ninth aspect, a fourth processor is provided. The fourth processor is configured to receive a virtual address of a second synchronization register from a first processor. The second synchronization register is a register corresponding to a second synchronization event, and a value of the second synchronization register includes a first value or a second value. The first value is used to indicate that the second synchronization event does not occur, and the second value is used to indicate that the second synchronization event occurs. The first processor and the fourth processor are processors in different AI servers. The first processor includes a first central processing unit CPU, and the fourth processor includes a second CPU. The fourth processor is further configured to send a remote direct memory access RDMA task corresponding to the second synchronization event to a fifth processor. The RDMA task corresponding to the second synchronization event is used to indicate that the second synchronization event occurs, and the RDMA task corresponding to the second synchronization event includes a virtual address of the second synchronization register. The fifth processor includes a third NPU.

According to a tenth aspect, a fifth processor is provided. The fifth processor is configured to: receive an RDMA task corresponding to a second synchronization event, and reset a value of a second synchronization register to a second value based on a virtual address of the second synchronization register through an RDMA apparatus. The RDMA task corresponding to the second synchronization event is used to indicate that the second synchronization event occurs, and the RDMA task corresponding to the second synchronization event includes the virtual address of the second synchronization register. The fifth processor includes a third NPU. The value of the second synchronization register includes a first value or the second value. The first value is used to indicate that the second synchronization event does not occur, and the second value is used to indicate that the second synchronization event occurs.

According to an eleventh aspect, an electronic device is provided. The electronic device includes a memory and the synchronization apparatus according to any one of the fourth aspect, the fifth aspect, or the sixth aspect.

According to a twelfth aspect, a chip is provided. The chip includes the first processor according to the first aspect and an interface circuit. The first processor is configured to communicate with another apparatus through the interface circuit, to implement the method according to the first aspect.

According to a thirteenth aspect, a chip is provided. The chip includes the first processor and the second processor according to the first aspect and an interface circuit. The first processor communicates with the second processor through the interface circuit, to implement the method according to the first aspect.

According to a fourteenth aspect, a chip is provided. The chip includes the first processor, the second processor, and the third processor according to the first aspect and an interface circuit. The first processor, the second processor, and the third processor communicate with each other through the interface circuit, to implement the method according to the first aspect.

According to a fifteenth aspect, a chip is provided. The chip includes the fourth processor and the fifth processor according to the second aspect or the third aspect and an interface circuit. The fourth processor communicates with the fifth processor through the interface circuit, to implement the method according to any one of the foregoing aspects.

According to a sixteenth aspect, an AI server is provided. The AI server includes a CPU and one or more AI accelerators. The CPU is the first processor according to any one of the foregoing aspects, and the one or more AI accelerators include at least one of the second processor or the third processor according to any one of the foregoing aspects.

According to a seventeenth aspect, an AI server is provided. The AI server includes a CPU and one or more AI accelerators. The CPU is the fourth processor according to any one of the foregoing aspects, and the AI accelerator is the fifth processor according to any one of the foregoing aspects.

According to an eighteenth aspect, an AI cluster is provided. The AI cluster includes a plurality of AI servers, and the AI server includes a CPU and one or more AI accelerators. The CPU includes the first processor according to any one of the foregoing aspects, and the AI accelerator includes at least one of the second processor or the third processor according to any one of the foregoing aspects.

According to a nineteenth aspect, an AI cluster is provided. The AI cluster includes a plurality of AI servers, and the AI server includes a CPU and one or more AI accelerators. The CPU includes the fourth processor according to any one of the foregoing aspects, and the AI accelerator includes the fifth processor according to any one of the foregoing aspects.

According to a twentieth aspect, a communications system is provided. The communications system includes at least one of an AI accelerator, the AI server according to the eleventh aspect, the AI server according to the twelfth aspect, the AI cluster according to the thirteenth aspect, or the AI cluster according to the fourteenth aspect. The AI accelerator includes at least one of the second processor, the third processor, or the fifth processor according to any one of the foregoing aspects.

According to a twenty-first aspect, an API is provided. The API is deployed in a processor, and the API is configured to create a synchronization object for a synchronization event. In some embodiments, the API may be NotifyCreat (deviceID, notify), where an input deviceID is an ID of an AI accelerator, and an output notify is a synchronization object.

According to a twenty-second aspect, an API is provided. The API is deployed in a processor, and the API is configured to deliver a wait task corresponding to a synchronization event. In some embodiments, the API may be a NotifyWait (notify, stream) interface, and the interface is configured to wait for, in the stream, a synchronization event corresponding to a synchronization object to occur.

According to a twenty-third aspect, an API is provided. The API is deployed in a processor, and the API is configured to deliver a record task corresponding to a synchronization event. In some embodiments, the API may be a NotifyRecord (notify, stream) interface, and the interface is configured to set occurrence of a synchronization event corresponding to a synchronization object in the stream.

According to a twenty-fourth aspect, an API is provided. The API is deployed in a processor, and the API is configured to set a global name of a synchronization object. In some embodiments, the API may be IpcSetNotifyName (notify, name), and is configured to set a global name of a synchronization object notify.

According to a twenty-fifth aspect, an API is provided. The API is deployed in a processor, and the API is configured to open a synchronization object. In some embodiments, the API may be IpcOpenNotify (notify, name), and is configured to open a synchronization object notify based on a global name of the synchronization object.

According to a twenty-sixth aspect, an API is provided. The API is deployed in a processor, and the API is configured to obtain a virtual address of a register corresponding to a synchronization object. In some embodiments, the API may be NotifyGetAddr (notify, addr), where an input is a synchronization object notify, and an output is a virtual address of a synchronization register corresponding to the synchronization object notify.

According to a twenty-seventh aspect, an API is provided. The API is deployed in a processor, and the API is configured to release a synchronization register. In some embodiments, the API may be NotifyDestroy (notify), and the interface may be configured to destroy a synchronization object notify, and release a synchronization register corresponding to the synchronization object.

According to a twenty-eighth aspect, an API is provided. The API is deployed in a processor, and the API is configured to deliver an RDMA task corresponding to a synchronization event. In some embodiments, the API may be RDMAsend (addr, 1), and is configured to indicate to write a second value 1 to a virtual address addr.

DETAILED DESCRIPTION

Figure 1A:
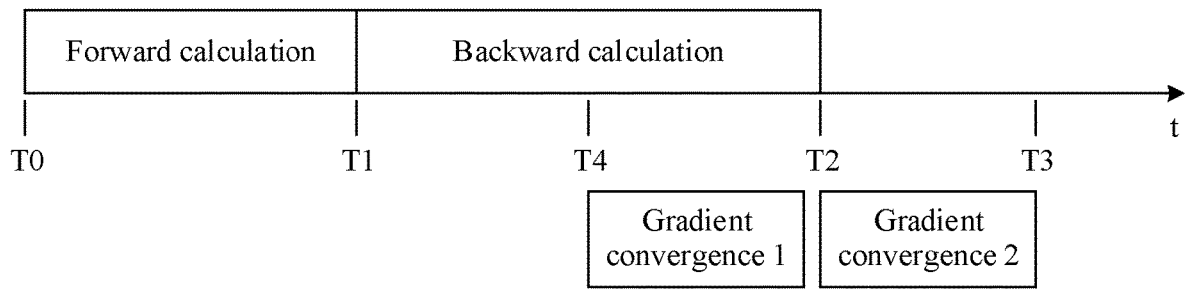
FIG. 1A is a schematic diagram of an AI training process according to an embodiment.

The following describes the technical solutions in the embodiments with reference to the accompanying drawings. "At least one" means one or more, and "a plurality of" means two or more. "And/or" describes an association between associated objects, and indicates that three relationships may exist. For example, A and/or B may indicate the following cases: A exists alone, both A and B exist, and B exists alone, where A and B may be singular or plural. The character "/" usually indicates an "or" relationship between associated objects. "At least one of the following items (pieces)" or a similar expression thereof means any combination of these items, including any combination of singular items (pieces) or plural items (pieces). For example, at least one (piece) of a, b, or c may represent: a, b, c, a and b, a and c, b and c, or a, b, and c, where a, b, and c may be singular or plural. In addition, to clearly describe the technical solutions in the embodiments, terms such as "first" and "second" are used in the embodiments to distinguish between same items or similar items that provide basically same functions or purposes. A person skilled in the art may understand that the terms such as "first" and "second" do not limit a quantity and an execution sequence. For example, "first" in a first processor and "second" in a second processor in the embodiments are only used to distinguish between different processors. Description such as "first" and "second" in the embodiments is merely used for indicating and distinguishing between described objects, does not show a sequence, does not indicate a specific limitation on a quantity of devices in the embodiments, and does not constitute any limitation on the embodiments.

It should be noted that the word "for example" or "such as" is used to represent giving an example, an illustration, or a description. Any embodiment or design scheme described as an "example" or "for example" should not be explained as being more preferred or having more advantages than another embodiment or design scheme. Exactly, use of the word "example", "for example", or the like is intended to present a related concept in a specific manner.

In an artificial intelligence scenario (for example, neural network training), a plurality of AI servers are often required to form a cluster to provide required computing power. Generally, an AI server may include one or more AI accelerators. As a computing device, the AI accelerator may be a type of microprocessor that accelerates dedicated tasks such as a machine learning process or algorithm used for intelligent computing or another data-intensive or sensor-driven task, and may further include an instruction set related to the type of microprocessor. The dedicated tasks may include AI processing, for example, an artificial neural network, machine learning (ML) training, ML optimization/learning, inference, classification, visual data processing, network data processing, object detection, rule analysis, content processing, or another operation. The AI accelerator may be a neural-network processing unit NPU, and may include one or more of a graphics processing unit GPU, a digital signal processor (DSP), a system on a chip (SOC), a field-programmable gate array (FPGA), an application-specific integrated circuit (ASIC), or the like. The AI accelerator may run a related AI instruction set by loading weights, bias, training data, code, or the like, to complete the dedicated task. A specific form of the AI accelerator is not limited in the embodiments. An example in which the AI accelerator is an NPU is used for description in the following embodiments.

As shown in FIG. 1A, a training process of a neural network generally includes a plurality of iterations, and each iteration includes three phases: forward calculation, backward calculation, and gradient convergence. Each AI accelerator independently performs forward calculation and backward calculation. Calculated gradients need to be converged on a plurality of AI accelerators. The backward calculation is usually backpropagation of an error. Therefore, after the error (a distinction between a recognition value of the neural network and the corresponding monitoring data) is obtained, weights of the neural network are adjusted based on gradient descent method. Therefore, the backward calculation includes processes of "obtaining an error value" and "performing backpropagation based on the error value", and the latter process (an error backpropagation process) includes a process of adjusting weights between layers of the neural network based on gradients. Currently, typical AI model (for example, a convolutional neural network used for image recognition) usually includes a plurality of neuron "layers", and backpropagation process is to sequentially and reversely propagate an error value from output layer of the neural network to input layer of the neural network. In the backpropagation process, gradient of weights parameter are calculated based on the error value, and weights of the neural network are further updated based on gradient direction of the weight parameter. Therefore, in backward calculation process, after gradient values of parts of the neuron layers are calculated, gradient convergence could be started. For example, for a 100-layer neural network, gradient convergence may be started after gradient calculation of the 100th to 80th layers are completed. In this way, after all backward calculation is completed, time for performing gradient convergence on remaining data is shorter than time for performing gradient convergence on all data, so that training efficiency could be improved.

The foregoing forward calculation and backward calculation processes are executed by each AI accelerator. Gradient convergence mainly includes data transmission between a plurality of AI accelerators in AI server, network transmission among AI servers, synchronous waiting among the AI accelerators, gradient data accumulation among AI accelerators, and the like. Gradient convergence does not require participation of a computing unit of the AI accelerator. Therefore, during gradient convergence, the computing unit of the AI accelerators are in idle mode.

For example, as shown in FIG. 1A, the AI accelerator performs forward calculation from a moment T0 to a moment T1, and performs backward calculation from the moment T1 to a moment T2. In the backward calculation process, to improve training efficiency, after some data is calculated from the moment T1 to a moment T4, gradient convergence may be performed from the moment T4. To be specific, backward calculation and gradient convergence 1 are performed at the same time from the moment T4 to the moment T2. After the backward calculation is completed, only gradient convergence of remaining data is performed from the moment T2 to a moment T3. Therefore, the moment T0 to the moment T2 is calculation duration, and the computing unit of the AI accelerator performs neither forward calculation nor backward calculation from the moment T2 to the moment T3 and is in idle mode. Because only gradient convergence is performed on the AI cluster, the moment T2 to the moment T3 may also be referred to as gradient convergence time.

For example, during the foregoing gradient convergence, an all-reduce algorithm may be used. The all-reduce algorithm is a type of algorithm used to efficiently integrate data in different AI accelerators, and then distribute a result to each AI accelerator.

Gradient convergence performance is a key factor for evaluating cluster training performance. The shorter the gradient convergence time; the higher cluster linearity. The cluster linearity L may be calculated by using the following formula: L=(calculation duration)/(calculation duration+Tidle).

Tidle is time in which the computing unit of the AI accelerator is in idle mode, that is, Tidle is the gradient convergence time (for example, all-reduce time). Longer gradient convergence time indicates longer time in which the computing unit of the AI accelerator is in idle mode and lower cluster linearity L. Shorter gradient convergence time indicates shorter time in which the computing unit of the AI accelerator is in idle mode and higher cluster linearity L.

For example, as shown in FIG. 1A, because gradient convergence 2 performed from the moment T2 to the moment T3 does not require participation of the computing units of the AI accelerator, the computing units of the AI accelerator are in idle mode. In other words, the gradient convergence time is from the moment T2 to the moment T3. Therefore, shorter duration from the moment T2 to the moment T3 indicates higher cluster linearity, and longer duration from T2 to T3 indicates lower cluster linearity. Therefore, synchronization transmission and synchronization waiting time during gradient convergence may be reduced, to improve the cluster linearity.

For example, a gradient convergence algorithm of the cluster is Ring algorithm in a single AI server. The AI server may include five AI accelerators, for example, GPU 0 to GPU 4. Ring algorithm includes two phases: a reduce-scatter phase and an all-gather phase. In the reduce-scatter phase, data is exchanged between the GPUs, so that each GPU finally gets a portion of a final result. In the all-gather phase, the GPUs exchange these blocks, so that all the GPUs finally get the completed final result.

Figure 1B:
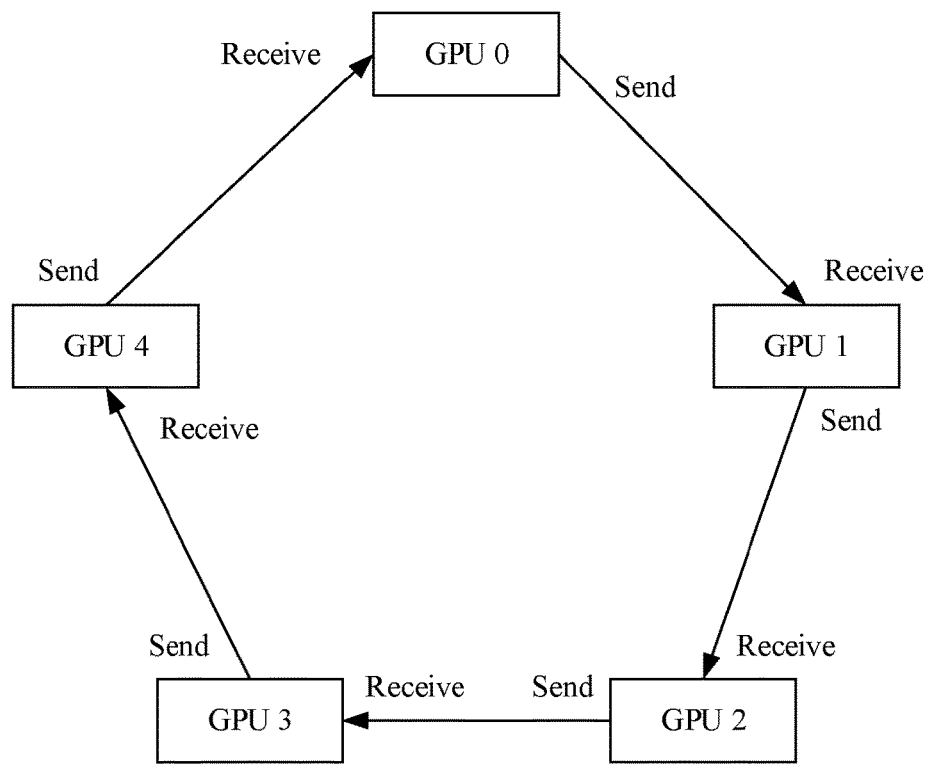
FIG. 1B is a schematic diagram of a structure of a Ring algorithm in a single AI server according to an embodiment.
Figures 2A, 2B:
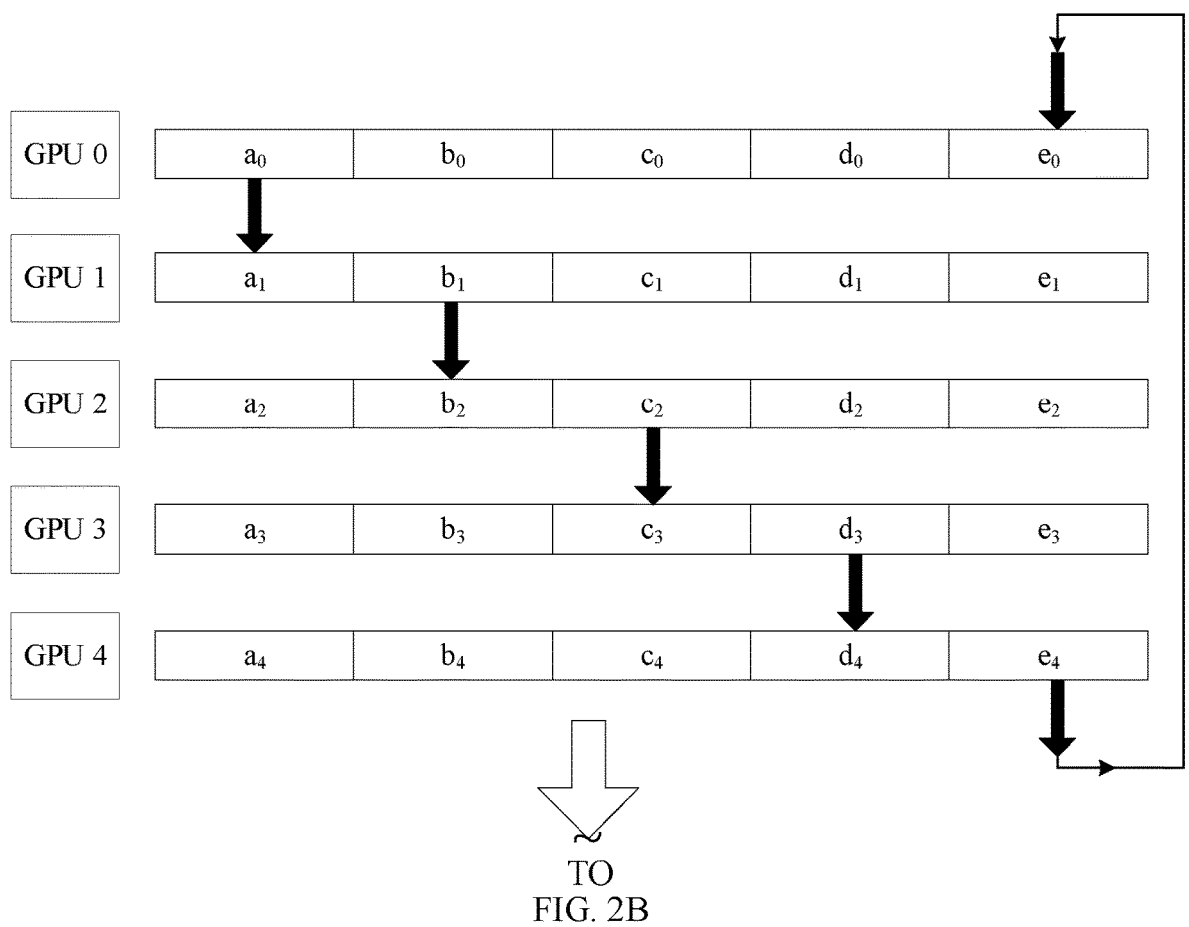
FIG. 2A to FIG. 2E are a schematic diagram of a calculation process of a reduce-scatter phase in a Ring algorithm in a single AI server according to an embodiment.
Figure 2B:
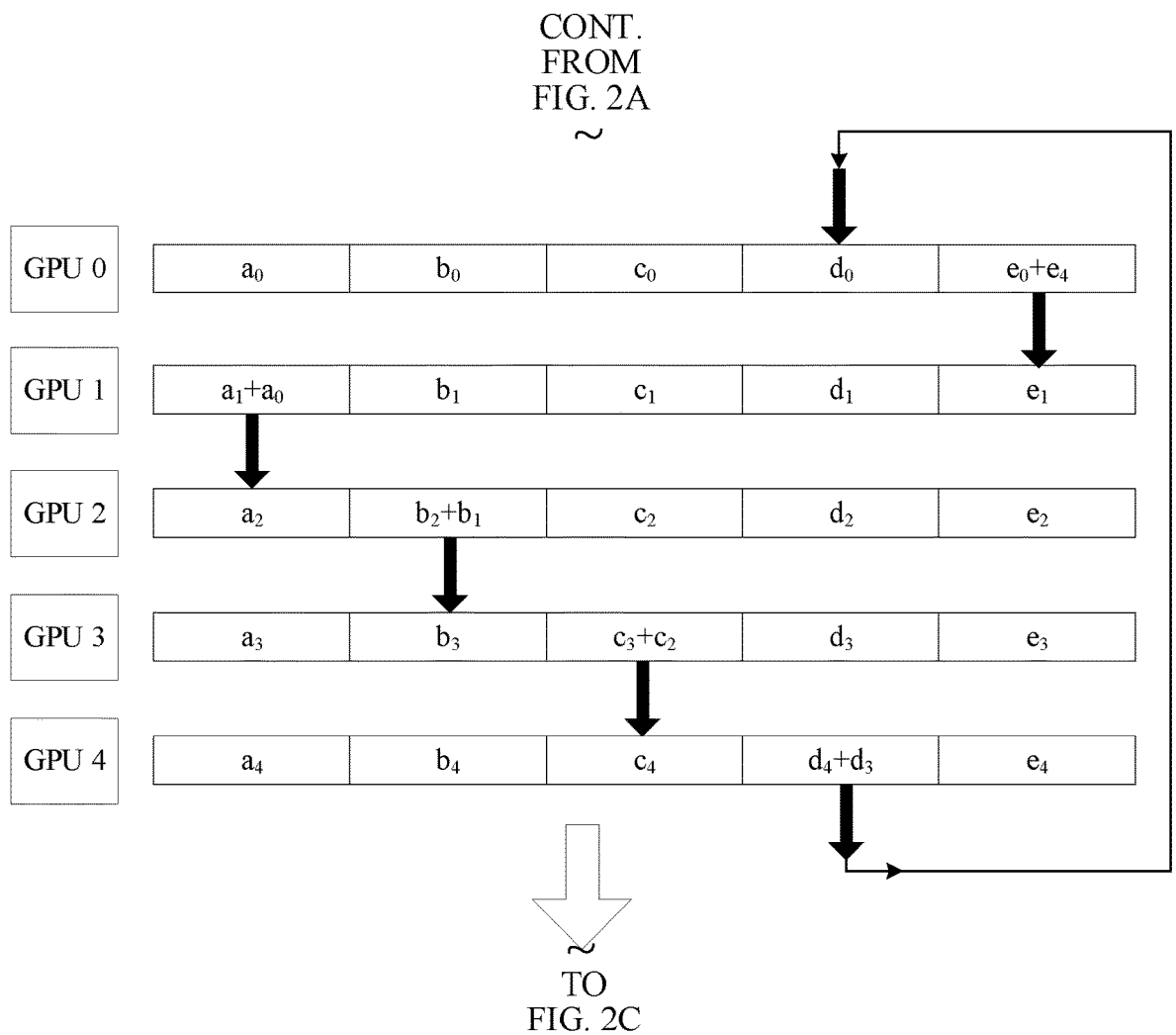
Figure 2C:
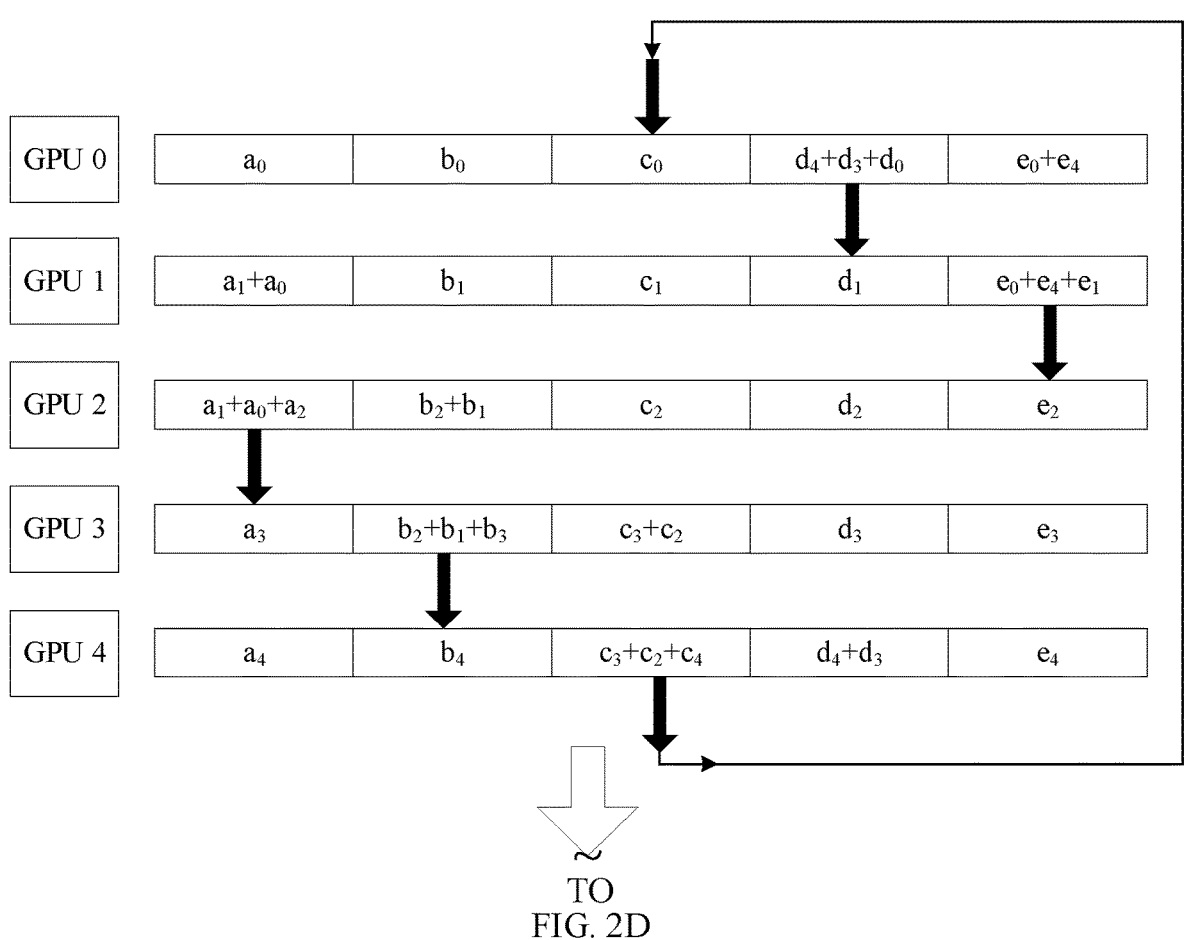
Figure 2D:
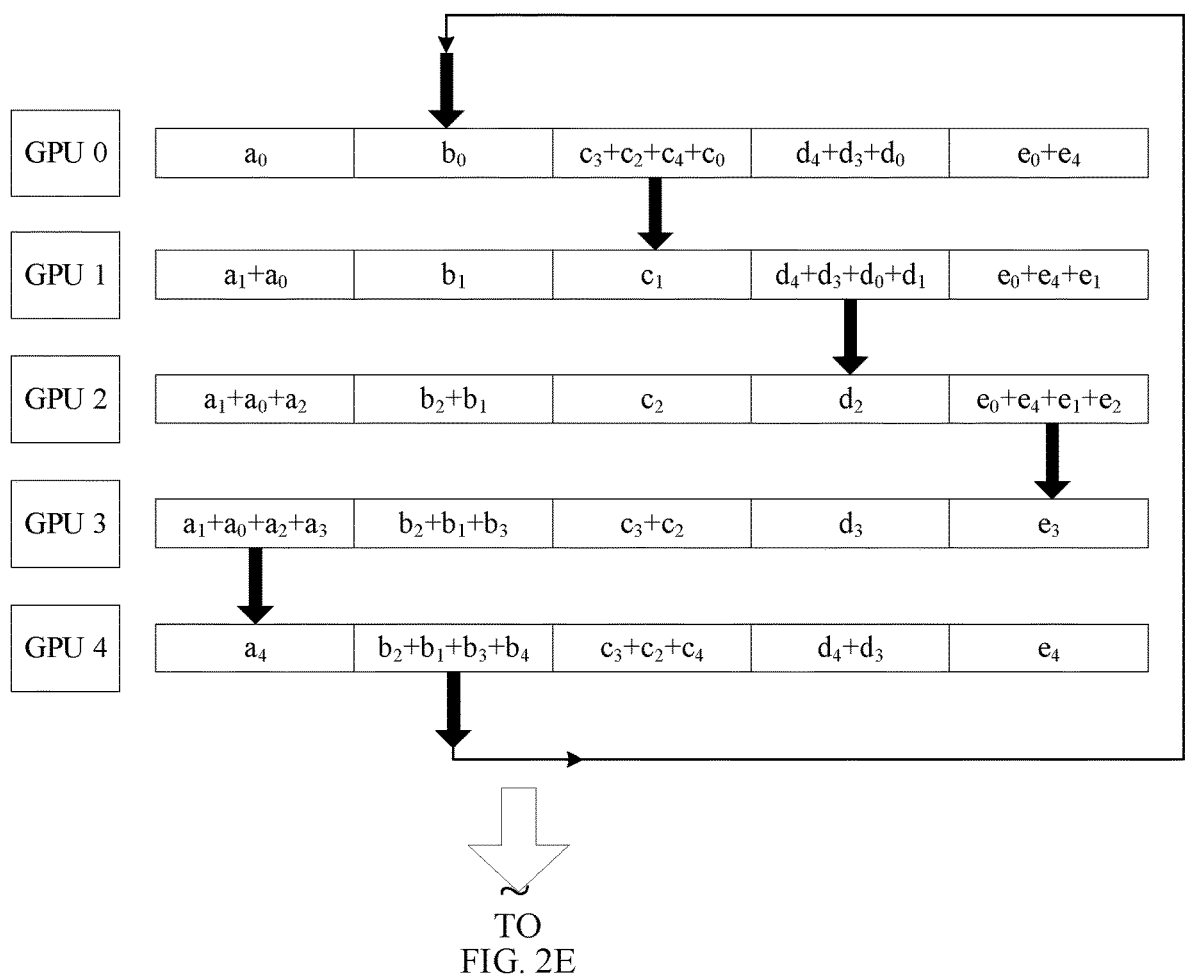
Figure 2E:
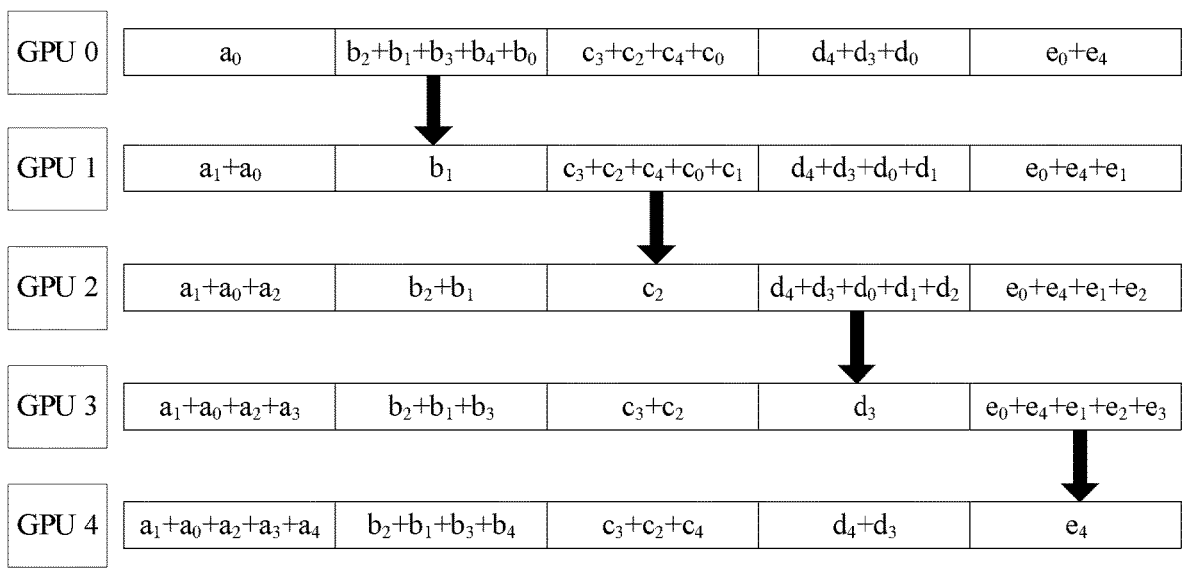

In some embodiments, in the Ring algorithm, each GPU has one left neighbor and one right neighbor, and each GPU only sends data to the right neighbor of the GPU and receives data from the left neighbor of the GPU. For example, as shown in FIG. 1B, an AI server includes five GPUs, which are respectively GPU 0 to GPU 4, and each GPU has one left neighbor and one right neighbor. The GPU 0 only sends data to a right neighbor GPU 1 of the GPU 0 and receives data from a left neighbor GPU 4 of the GPU 0. The GPU 1 only sends data to a right neighbor GPU 2 of the GPU 1 and receives data from a left neighbor GPU 0 of the GPU 1. The GPU 2 only sends data to a right neighbor GPU 3 of the GPU 2 and receives data from a left neighbor GPU 1 of the GPU 2. The GPU 3 only sends data to a right neighbor GPU 4 of the GPU 3 and receives data from a left neighbor GPU 2 of the GPU 3. The GPU 4 only sends data to a right neighbor GPU 0 of the GPU 4 and receives data from a left neighbor GPU 3 of the GPU 4.

For example, the AI server includes five GPUs, which are respectively the GPU 0 to the GPU 4, and each GPU divides data into five relatively small data blocks. With reference to FIG. 1B, as shown in FIG. 2A to FIG. 2E, in the reduce-scatter phase, each GPU performs four iterations of reduce-scatter. In each iteration, each GPU sends one of the data blocks to a right neighbor of the GPU, and receives one data block from a left neighbor of the GPU and accumulates the data block into another data block in the data blocks. Different data blocks are sent and received in each iteration. For example, the GPU 0 sends a data block a0 to the right neighbor GPU 1 of the GPU 0, and receives a data block e4 from the left neighbor GPU 4 of the GPU 0 and accumulates the data block e4 into a data block e0; the GPU 1 sends a data block b1 to the right neighbor GPU 2 of the GPU 1, and receives the data block a0 from the left neighbor GPU 0 of the GPU 1 and accumulates the data block a0 into a data block a1; and so on. As shown in FIG. 2A to FIG. 2E, in the reduce-scatter phase, after the GPU 0 to the GPU 4 each perform four iterations, a final value may be obtained for each data block of each GPU.

To implement all-reduce, with reference to FIG. 1B, as shown in FIG. 3A to FIG. 3E, in the all-gather phase, the GPU 0 to the GPU 4 each perform four iterations again. However, in each iteration, the GPU sends one of the data blocks to the right neighbor of the GPU, and receives a data block from the left neighbor of the GPU and overwrites another data block in the data blocks with the data block. For example, the GPU 0 sends a data block b2+b1+b3+b4+b0 to the right neighbor GPU 1 of the GPU 0, and receives a data block a1+a0+a2+a3+a4 from the left neighbor GPU 4 of the GPU 0 and overwrites the data block a0 with the data block a1+a0+a2+a3+a4; the GPU 1 sends a data block c3+c2+c4+c0+c1 to the right neighbor GPU 2 of the GPU 1, and receives the data block b2+b1+b3+b4+b0 from the left neighbor GPU 0 of the GPU 1 and overwrites the data block b1 with the data block b2+b1+b3+b4+b0; and so on. As shown in FIG. 3A to FIG. 3E, in the all-gather phase, after the GPU 0 to the GPU 4 each perform four iterations, all the GPUs have a full cumulative value for an entire array.

It would be appreciated from FIG. 1B, FIG. 2A to FIG. 2E, and FIG. 3A to FIG. 3E, that in the gradient convergence algorithm, a synchronization mechanism among the GPUs may be needed, so that the result obtained through the all-reduce is correct. For example, the GPU 1 can transfer a0+a1 to the GPU 2 only after the GPU 0 transfers a0 to the GPU 1. If the GPU 1 transfers a result to the GPU 2 in advance, the all-reduce result is incorrect. If the GPU 1 delays sending a result to the GPU 2, all-reduce needs a relatively longer time and therefore wastes computing power of the GPUs. Therefore, a proper synchronization mechanism may be required to ensure correct running of an AI algorithm and improve computing power of the AI accelerators.

It would be appreciated that in some embodiments the Ring algorithm in a single AI server is used as an example to show that a synchronization mechanism may be required to ensure the algorithm running correctly in an AI training scenario. A specific scenario of the synchronization mechanism is not limited in this embodiment. In actual application, in which a plurality of AI servers form a cluster to perform AI training, it may be necessary to provide an appropriate synchronization mechanism to reduce synchronization transmission and synchronization waiting time in an AI accelerator, among different AI accelerators in an AI server, and among AI servers.

One synchronization mechanism is to use a semaphore mechanism to ensure that intra-process synchronization and inter-process synchronization are mutually exclusive. However, this method supports synchronization only on a standard processor architecture (for example, X86 or ARM), it does not support synchronization among chips mounted on AI accelerator, and it does not support synchronization among AI servers.

Another synchronization method is an event synchronization mechanism provided by a Compute Unified Device Architecture (CUDA) of Nvidia. The event synchronization mechanism is used for intra-process synchronization, inter-process synchronization, intra-chip synchronization in a graphics processing unit (GPU), and inter-chip synchronization among GPUs. However, this event mechanism does not support synchronization among AI servers, and time cost are relatively high when synchronization performed among GPU chips, it may need 10 μs. In addition, when the event mechanism is used for inter-process synchronization, an API design is relatively complex and is inconvenient for a developer to use.

Embodiments provide a synchronization method. The method can implement synchronization in an AI accelerator, among different AI accelerators in an AI server, and among AI servers. In addition, synchronization costs are relatively low, and an API design is relatively simple and is convenient for the developer to use.

The synchronization method may be applied to a computing architecture, and the computing architecture may be a computing architecture of an AI server. The computing architecture of the AI server is a heterogeneous computing hardware architecture, and the architecture includes a central processing unit (CPU) and one or more AI accelerators. CPU may send an AI computing task to the AI accelerator. After receiving the AI computing task sent by the CPU, the AI accelerator executes the AI computing task, and reports an execution result to the CPU.

Figures 3A, 3B:
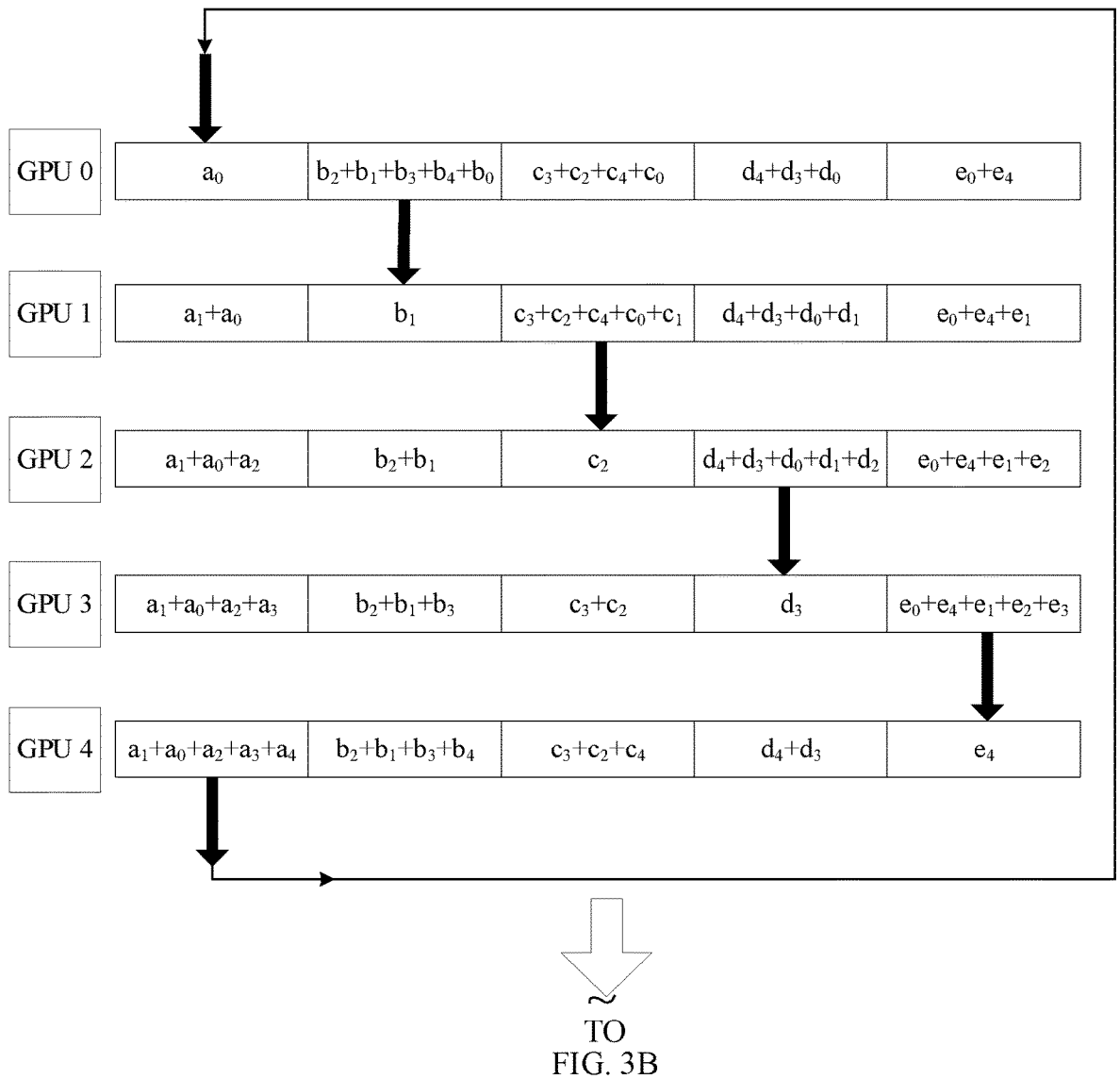
FIG. 3A to FIG. 3E are a schematic diagram of a calculation process of an all-gather phase in a Ring algorithm in a single AI server according to an embodiment.
Figure 3B:
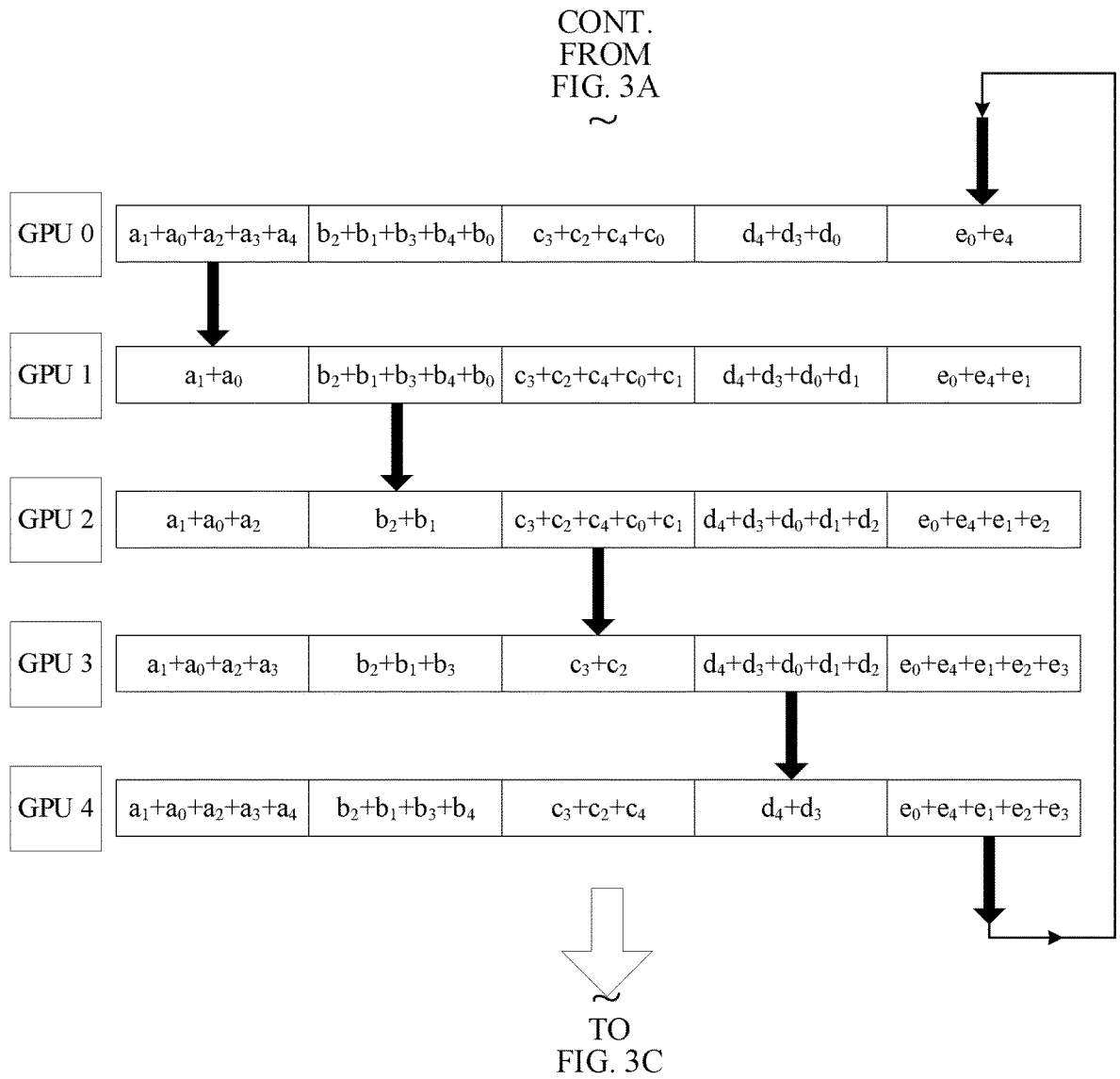
Figure 3C:
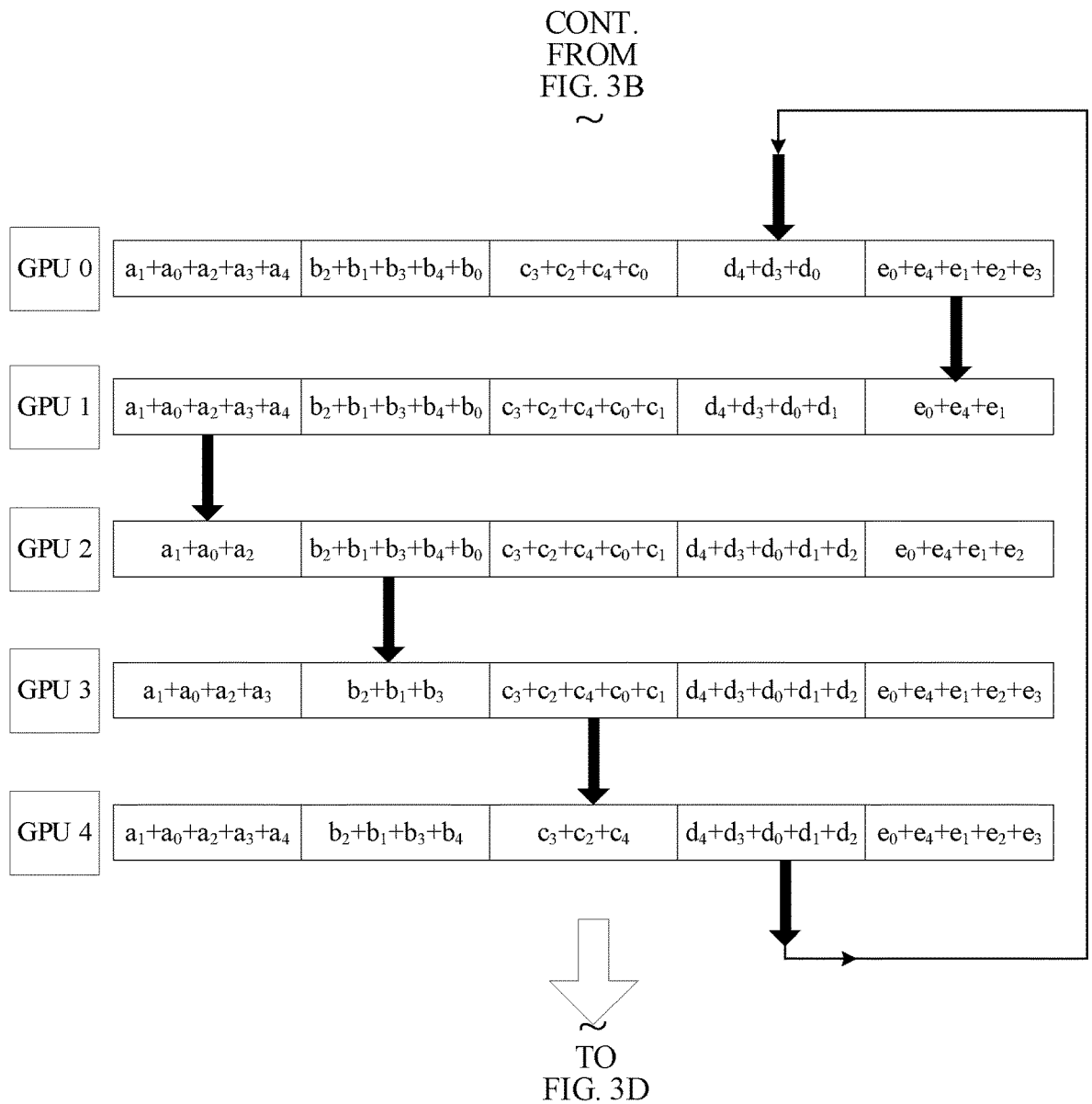
Figure 3D:
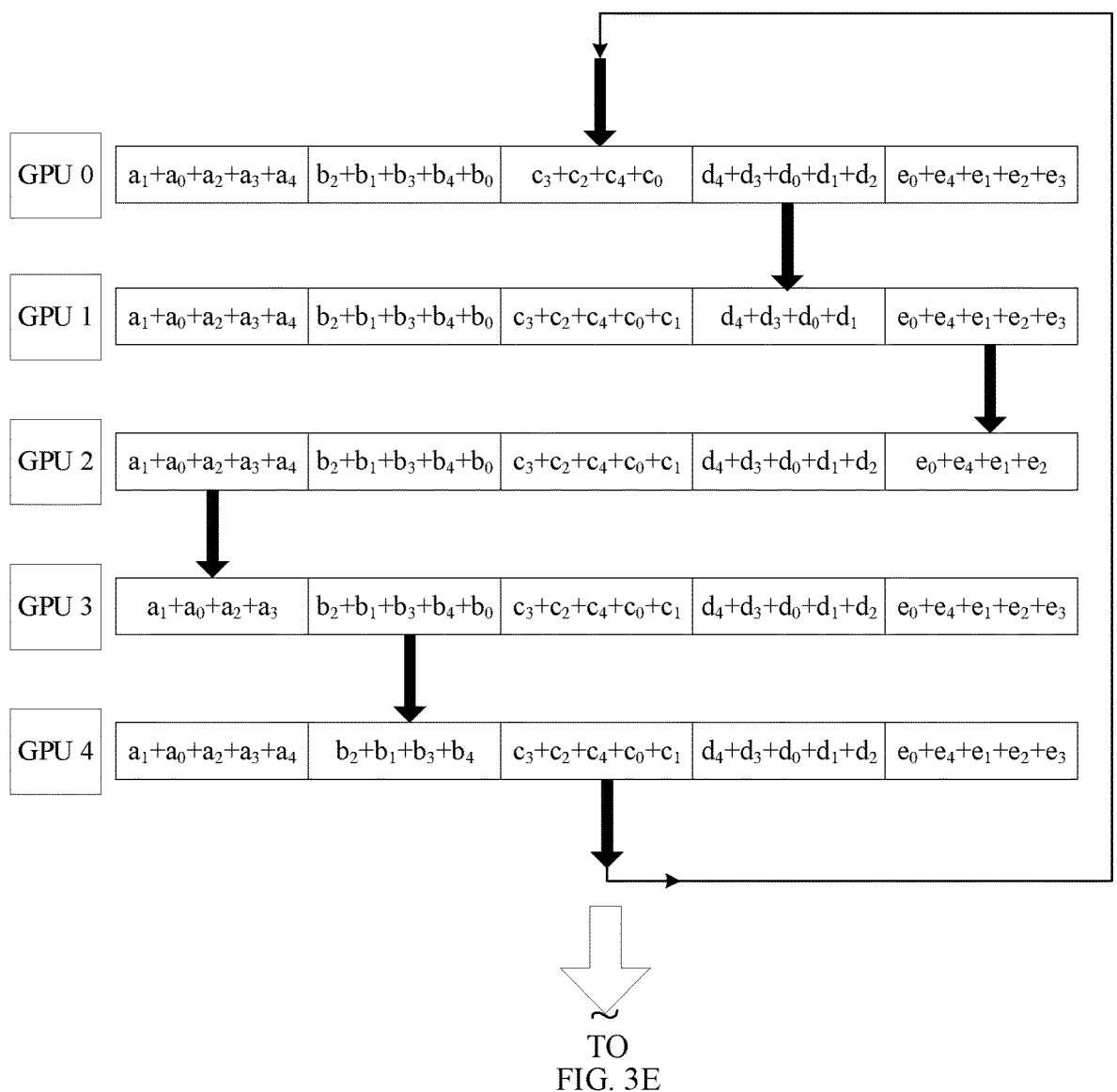
Figures 3D, 3E, 4A:
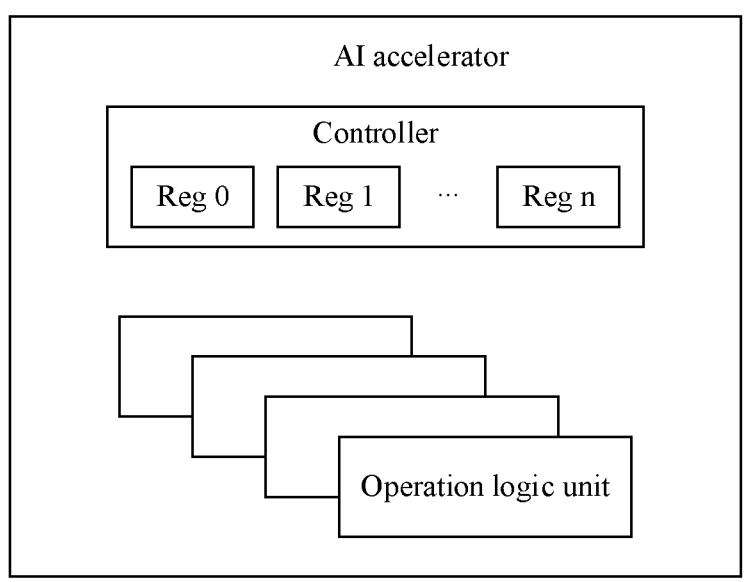
FIG. 4A is a schematic diagram of a structure of an AI accelerator according to an embodiment.

FIG. 4A is an AI accelerator according to some embodiments. As shown in FIG. 4A, the AI accelerator includes a controller, an operation logic unit, and a plurality of synchronization registers.

The controller is configured to receive an AI computing task sent by a CPU, and report an execution result of the computing task to the CPU.

The operation logic unit is configured to execute computing tasks delivered by the controller, and return an execution result of each computing task to the controller.

As shown in FIG. 4A, the AI accelerator includes a plurality of synchronization registers, and the plurality of synchronization registers are respectively a Reg 0, a Reg 1, ..., and a Reg n. Each synchronization register is configured to correspond to one synchronization event, and different values of the synchronization register may be used to indicate whether the synchronization event corresponding to the synchronization register occurs. In some embodiments, as shown in FIG. 4A, the plurality of synchronization registers may be disposed in the controller of the AI accelerator.

For example, the values of each synchronization register may include a first value and a second value. The first value is used to indicate that the synchronization event corresponding to the synchronization register does not occur, and the second value is used to indicate that the synchronization event corresponding to the synchronization register occurs. The first value and the second value are different values. Specific values of the first value and the second value are not limited in this embodiment. In the following embodiments, an example in which the first value is 0 and the second value is 1 is used for description.

In some embodiments, the synchronization event corresponding to the synchronization register may occur in an AI accelerator, or may occur among different AI accelerators in an AI server, or may occur among different AI servers (where each AI server includes at least one AI accelerator). It would be appreciated that when the synchronization event corresponding to the synchronization register occurs in an AI accelerator, the AI accelerator may determine, based on the value of the synchronization register, whether the synchronization event occurs, so as to implement synchronization in the AI accelerator. When the synchronization event corresponding to the synchronization register occurs between different AI accelerators in an AI server, the AI accelerator may determine, based on the value of the synchronization register, whether the synchronization event occurs, so as to implement synchronization between the different AI accelerators in the AI server. When the synchronization event corresponding to the synchronization register occurs among different AI servers, an AI accelerator of an AI server may determine, based on the value of the synchronization register, whether the synchronization event occurs, so as to implement synchronization between AI accelerators.

In some embodiments, a specific quantity of synchronization registers disposed in each AI accelerator is not limited in this embodiment. For example, the AI accelerator supports a maximum of 1024 synchronization events at the same time. 1024 synchronization registers may be disposed in the AI accelerator, and one synchronization register may correspond to one synchronization event.

It may be understood that, for the AI accelerator provided in this embodiment, the plurality of synchronization registers are disposed in the AI accelerator, and each synchronization register is configured to correspond to one synchronization event, so that the AI accelerator may determine, based on the value of the synchronization register, whether the synchronization event corresponding to the synchronization register occurs. In this way, synchronization in an AI accelerator, among different AI accelerators in an AI server, and among AI servers can be implemented.

Figure 4B:
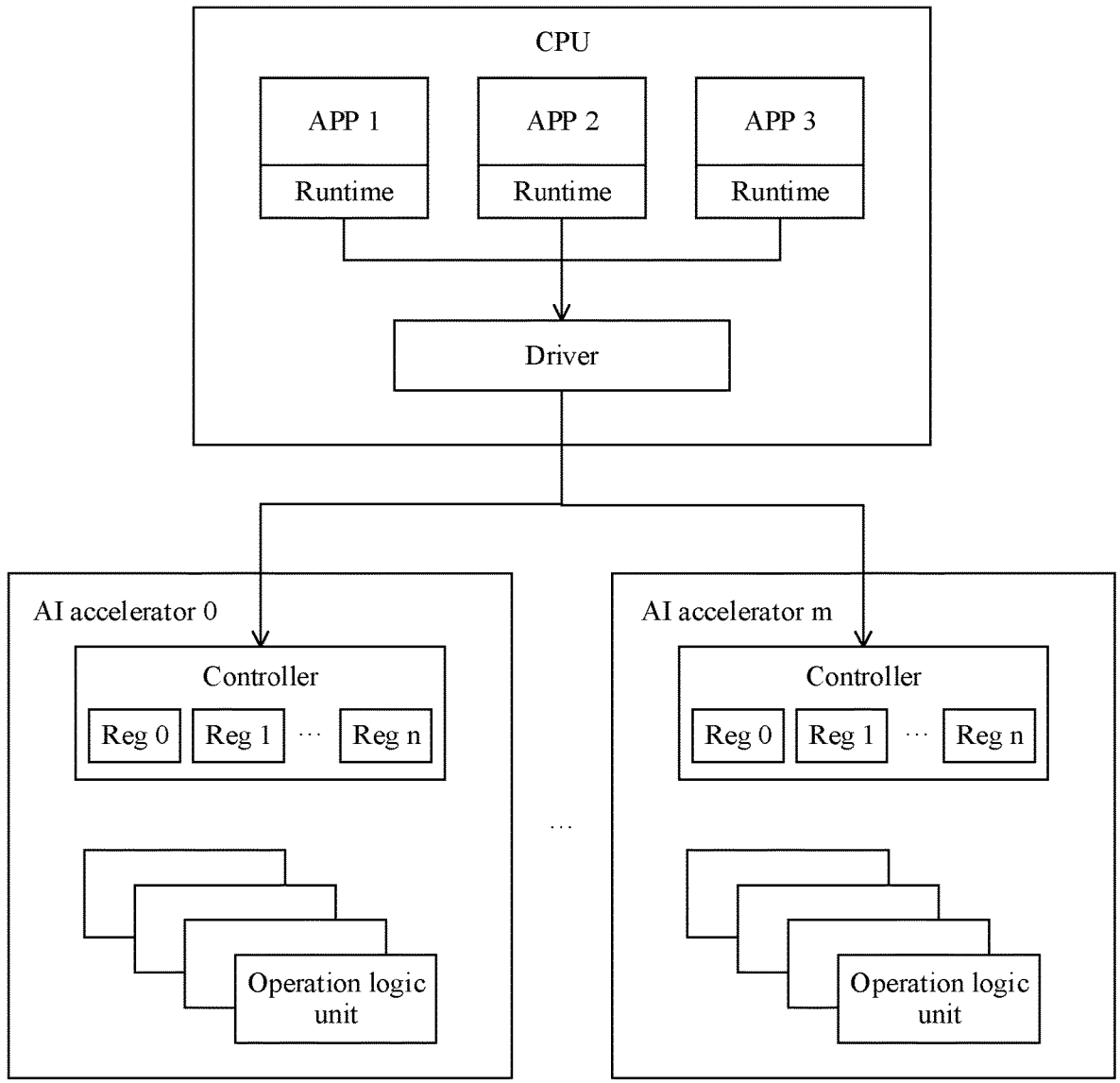
FIG. 4B is a schematic diagram of a structure of a computing architecture according to an embodiment.

The synchronization method may be applied to an AI server shown in FIG. 4B. As shown in FIG. 4B, the AI server may include a CPU and a plurality of AI accelerators. Each AI accelerator includes a group of synchronization registers, and each synchronization register may correspond to one synchronization event. Different values of the synchronization register may be used to indicate whether the corresponding synchronization event occurs.

As shown in FIG. 4B, a driver in the CPU is configured to provide a driver function for the AI accelerator. A user-mode driver layer runtime is deployed in an application (App), and the runtime is configured to provide a user-mode driver function of the AI accelerator. For example, the runtime includes a plurality of APIs. When running the APP, the CPU may invoke different API interfaces to implement interaction between software and hardware. The CPU may send an AI computing task to the AI accelerator by invoking the API. After receiving the AI computing task sent by the CPU, a controller in the AI accelerator executes the AI computing task, and reports an execution result to the CPU.

In some embodiments, the user-mode driver layer runtime of the APP provides the API. An upper-layer service APP may split an AI model (computing graph), convert the AI model into tasks such as a stream, a task, and an event that can be processed by the AI accelerator, and deliver the tasks to the AI accelerator through the API provided by the runtime. For example, the task is a computing task and is generally processed by an operation logic unit in the AI accelerator. The event is an event synchronization mechanism and is generally processed by the controller. The controller in the AI accelerator may concurrently schedule tasks of a plurality of streams for execution, but tasks in a same stream can be executed only in sequence.

In some embodiments, when the AI server includes a plurality of AI accelerators, quantities of synchronization registers disposed in different AI accelerators may be the same or different. In FIG. 4B, an example in which the AI server includes m+1 AI accelerators, and n synchronization registers are disposed in both an AI accelerator 0 and an AI accelerator m is used for illustration.

In some embodiments, when the AI server includes a plurality of AI accelerators, a plurality of synchronization registers may be disposed in each AI accelerator. Physical addresses of synchronization registers disposed in different AI accelerators in an AI server may be addressed in a global addressing manner. For example, a synchronization register in an AI server may be globally addressed based on an identifier (ID) of an AI accelerator plus an offset or in another manner. It may be understood that, because the synchronization registers in the plurality of AI accelerators in the AI server are globally addressed, a controller of each AI accelerator may learn a physical address of a synchronization register in another AI accelerator in the AI server, and may also access the synchronization register in the another AI accelerator by using the physical address.

For example, when the AI server includes only one AI accelerator, the AI accelerator and the CPU may be integrated on one chip, or may be separately integrated on different chips. When the computing architecture includes a plurality of AI accelerators, the plurality of AI accelerators may be integrated on one or more chips, and the CPU may be integrated on another chip, or the CPU and the AI accelerators may be integrated on one chip. A heterogeneous computing hardware form including the CPU and the AI accelerator in the AI server is not limited in this embodiment, and the descriptions herein are an example.

It may be understood that in this embodiment a group of synchronization registers are disposed in the AI accelerator in the AI server, and each synchronization register may correspond to one synchronization event, so that the AI accelerator may determine, based on a value of the synchronization register, whether the synchronization event corresponding to the synchronization register occurs. In this way, synchronization in an AI accelerator, among different AI accelerators in an AI server, and among AI servers can be implemented.

Figure 5:
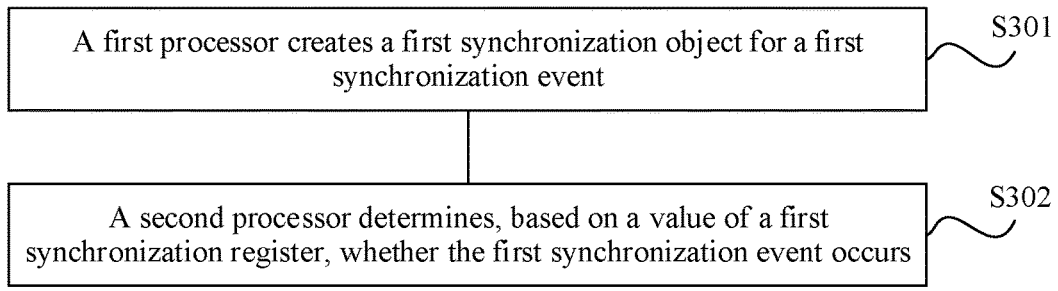
FIG. 5 is a schematic flowchart of a synchronization method according to an embodiment.

With reference to FIG. 4A and FIG. 4B, FIG. 5 shows a synchronization method according to an embodiment. The method includes the following steps.

S301: A first processor creates a first synchronization object for a first synchronization event.

The first processor may be a central control unit in an AI server, for example, a CPU. The first processor includes a first CPU.

In some embodiments, that a first processor creates a first synchronization object for a first synchronization event in step S301 may include: The first processor allocates a first synchronization register in a plurality of synchronization registers included in a second processor to the first synchronization event by invoking a first API, and stores an identifier of the first synchronization register in the first synchronization object. The second processor includes a second NPU, and the second processor is an NPU waiting for the first synchronization event to occur. In other words, the synchronization register allocated to the synchronization event in this embodiment is a synchronization register in the NPU waiting for the synchronization event to occur.

The first API is configured to create the synchronization object for the synchronization event. For example, the first API may be NotifyCreat (deviceID, notify), where an input deviceID is an ID of an AI accelerator, an output notify is a synchronization object, and the NotifyCreat interface is configured to create the synchronization object. The deviceID in the NotifyCreat interface is an ID of the second processor.

In some embodiments, when allocating the first synchronization register to the first synchronization event, the first processor may further reset a value of the first synchronization register to a first value, so that the value of the first synchronization register corresponds to a current state of the first synchronization event. The resetting the value of the first synchronization register to the first value may alternatively be setting the value of the first synchronization register to the first value. In actual application, a value of a synchronization register may be changed in a setting manner or a resetting (Reset) manner.

In some embodiments, the first processor may be a CPU in an AI server, and the second processor may be an AI accelerator in the AI server. The first processor and the second processor form a heterogeneous computing architecture, and the AI server may be a heterogeneous server. For example, the first processor may be a host CPU in the AI server, and the second processor may be an NPU in the AI server. The host CPU may allocate, to the first synchronization event by invoking the first API, the first synchronization register in a plurality of synchronization registers included in the NPU waiting for the synchronization event to occur.

In some embodiments, the first synchronization event may occur in an NPU, may occur among different NPUs in an AI server, or may occur among different AI servers. This is not limited in this embodiment.

Figure 6:
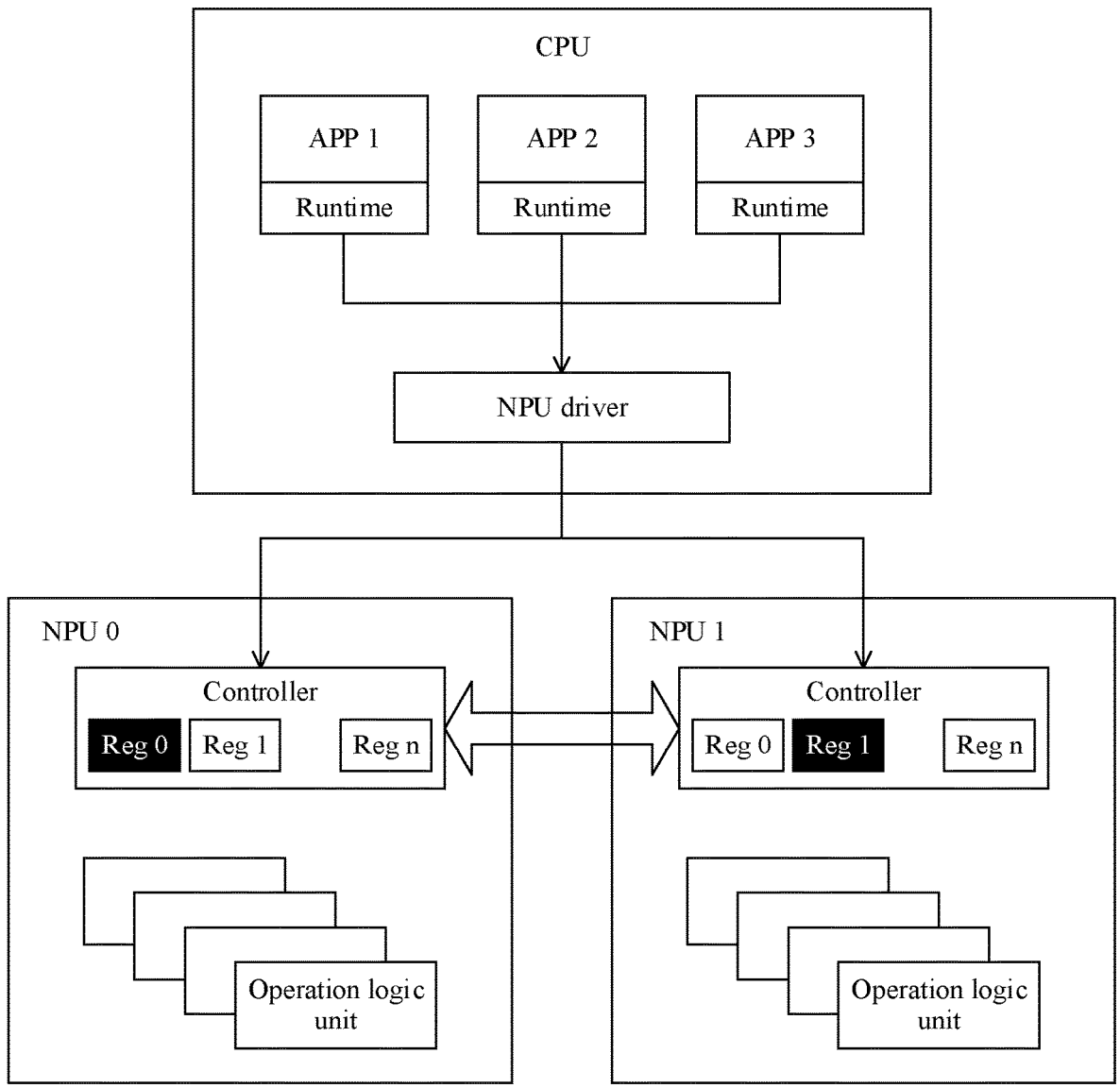
FIG. 6 is a schematic diagram of a structure of a computing architecture of an AI server according to an embodiment.

For example, FIG. 6 is a schematic diagram of a structure of a computing architecture of the AI server. As shown in FIG. 6, an example in which the AI accelerator is an NPU, the AI server includes a CPU and two NPUs, and the two NPUs are respectively an NPU 0 and an NPU 1 is used. The CPU may deliver a computing task, a record task, and a wait task to the NPU 0 and the NPU 1. The computing task is a computing task processed by an operation logic unit, the record task is used to indicate that a synchronization event occurs, and the wait task is used to wait for the synchronization event to occur.

Figures 7A, 7B:
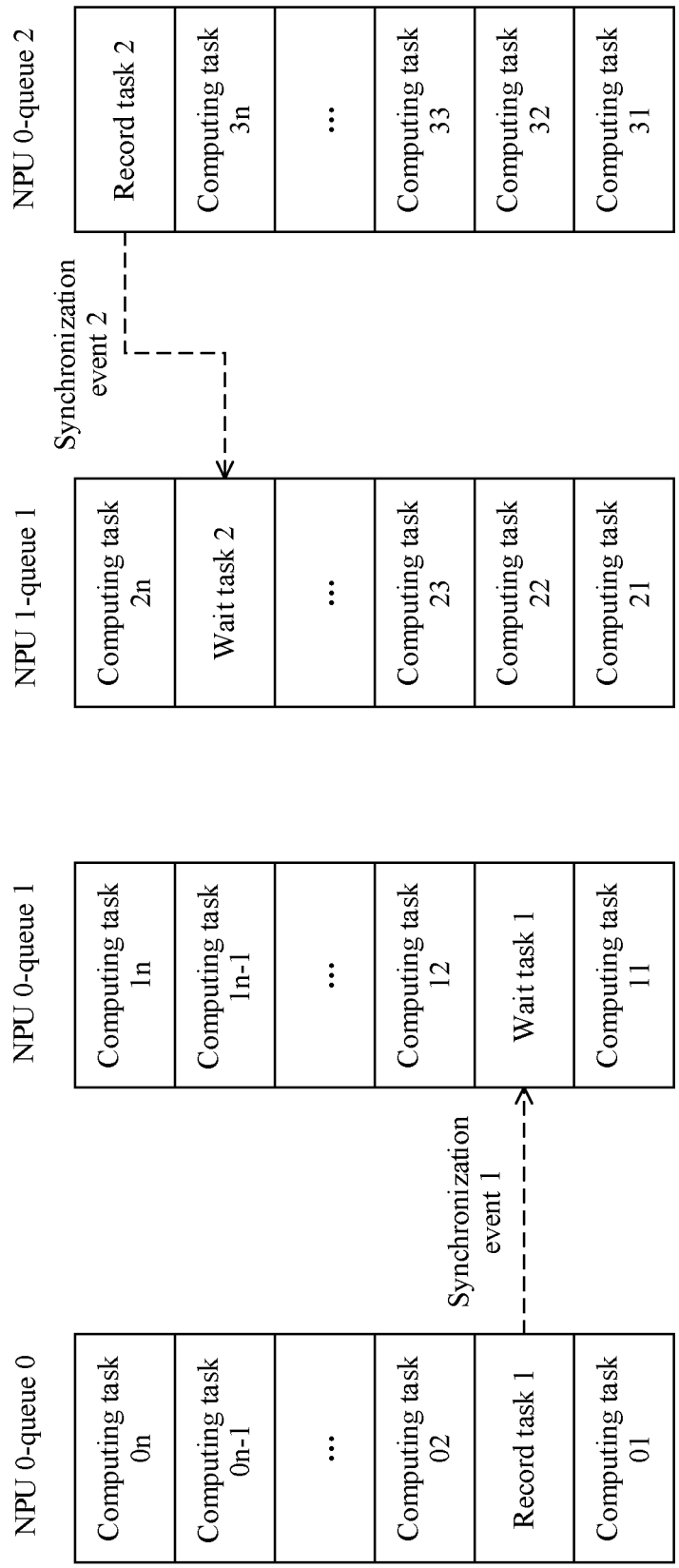
FIG. 7A and FIG. 7B are schematic diagrams of a computing task according to an embodiment.

For example, the synchronization event occurs in the AI accelerator. With reference to FIG. 6, as shown in FIG. 7A, a queue 1 of the NPU 0 can execute a computing task 12 only after a queue 0 of the NPU 0 completes executing a computing task 01. The synchronization may require the queue 1 of the NPU 0 to wait for a synchronization event 1 to occur, and the synchronization event 1 is that the queue 0 of the NPU 0 completes executing the computing task 01 and sends an execution result. When the synchronization event 1 does not occur, the queue 1 of the NPU 0 keeps waiting after executing a computing task 11. When the synchronization event 1 occurs (the queue 0 of the NPU 0 completes executing the computing task 01 and sends the execution result), the queue 0 of the NPU 0 may continue to execute the computing task 12. It may be understood that the synchronization event 1 occurs between two different queues of the AI accelerator NPU 0.

For another example, the synchronization event occurs among different AI accelerators in an AI server. With reference to FIG. 6, as shown in FIG. 7B, a queue 1 of the NPU 1 can execute a computing task 2n only after a queue 2 of the NPU 0 completes executing a computing task 3n. The synchronization may require the queue 1 of the NPU 1 to wait for a synchronization event 2 to occur, and the synchronization event 2 is that the queue 2 of the NPU 0 completes executing the computing task 3n and sends an execution result. When the synchronization event 2 does not occur, the queue 1 of the NPU 1 keeps waiting. When the synchronization event 2 occurs, the queue 1 of the NPU 1 may continue to execute the computing task 2n. It may be understood that the synchronization event 2 occurs among different AI accelerators (between the NPU 0 and the NPU 1) in the AI server.

For example, for the synchronization event 1, the queue 1 of the NPU 0 waits for the synchronization event 1 to occur. Therefore, the CPU may allocate a synchronization register in a plurality of synchronization registers included in the NPU 0 to the synchronization event 1, and store an identifier of the synchronization register in a synchronization object 1. The synchronization object 1 may be denoted as notify 1. For the synchronization event 2, the queue 1 of the NPU 1 waits for the synchronization event 2 to occur. Therefore, the CPU may allocate a synchronization register in a plurality of synchronization registers included in the NPU 1 to the synchronization event 2, and store an identifier of the synchronization register in a synchronization object 2. The synchronization object 2 may be denoted as notify 2.

In this embodiment, a group of synchronization registers are disposed in each NPU. Therefore, when determining that synchronization needs to be performed, an APP may invoke a NotifyCreat (deviceID, notify) interface, to allocate one synchronization register to each synchronization event on the NPU waiting for the synchronization event to occur.

For example, for the synchronization event 1 shown in FIG. 7A, the APP delivers a NotifyCreate API, and creates the synchronization object notify 1 on the NPU 0, and runtime invokes an interface of an NPU driver, to request the NPU driver to allocate a synchronization register for the synchronization event on the NPU 0. As shown in FIG. 6, the NPU driver may allocate a synchronization register Reg 0 in the plurality of synchronization registers in the NPU 0, record an identifier of the synchronization register Reg 0, and reset a value of the synchronization register to the first value 0. The NPU driver returns the ID of the synchronization register Reg 0 to the runtime. The runtime constructs the synchronization object notify 1, stores the ID of the synchronization register Reg 0 in notify 1, and returns notify 1 to the APP.

For another example, for the synchronization event 2 shown in FIG. 7B, the APP delivers the NotifyCreate API, and creates the synchronization object notify 2 on the NPU 1, and the runtime invokes the interface of the NPU driver, to request the NPU driver to allocate a synchronization register for the synchronization event on the NPU 1. As shown in FIG. 6, the NPU driver may allocate a synchronization register Reg 1 in the plurality of synchronization registers in the NPU 1, record an identifier of the synchronization register Reg 1, and reset a value of the synchronization register Reg 1 to the first value 0. The NPU driver returns the ID of the synchronization register Reg 1 to the runtime. The runtime constructs the synchronization object notify 2, stores the ID of the synchronization register Reg 1 in notify 2, and returns notify 2 to the APP.

In some embodiments, when allocating a synchronization register to a synchronization event, the NPU driver may allocate a synchronization register in idle mode in the NPU to the synchronization event. It may be understood that the synchronization register in idle mode in the NPU is a synchronization register that is not associated with another synchronization event or a synchronization register that was associated with another synchronization event but has been recycled (that is, disassociated from another synchronization event or synchronization object).

The synchronization event in this embodiment may occur in an NPU, or may occur among different NPUs in an AI server, or may occur among NPUs of different AI servers (where each AI server includes at least one NPU). In this embodiment, an example in which the synchronization event 1 in FIG. 7A occurs in an NPU, and the synchronization event 2 in FIG. 7B occurs among different NPUs in an AI server is used for description.

S302: The second processor determines, based on the value of the first synchronization register, whether the first synchronization event occurs.

Optionally, different values of the first synchronization register are used to indicate whether the first synchronization event occurs. Therefore, the second processor may determine, in the following two implementations based on the value of the first synchronization register, whether the first synchronization event occurs.

In a first implementation, step S302 may include: When the value of the first synchronization register is the first value, the second processor determines that the first synchronization event does not occur. The second processor continues to wait for the first synchronization event to occur. Until the value of the first synchronization register is a second value, the second processor determines that the first synchronization event occurs, and the second processor resets the value of the first synchronization register to the first value.

For example, if the value of the first synchronization register is the first value, it indicates that the first synchronization event does not occur. In this case, the second processor continues to wait for the first synchronization event to occur. Until the value of the first synchronization register is the second value, the second processor resets the value of the first synchronization register to the first value, and executes a subsequent task, to ensure correct synchronization.

In some embodiments, when the value of the first synchronization register is the first value, a controller of the second processor always checks the value of the first synchronization register. When the value of the first synchronization register changes from 0 to 1, because the first synchronization register is a synchronization register in the second processor, the controller of the second processor may immediately detect the change in the value of the first synchronization register. The second processor determines that the first synchronization event occurs, and the second processor clears the first synchronization register to 0, so that the first synchronization register may continue to perform a synchronization operation.

In a second implementation, step S302 may include: When the value of the first synchronization register is the second value, the second processor determines that the first synchronization event occurs, and the second processor resets the value of the first synchronization register to the first value.

For example, if the value of the first synchronization register is the second value, the second processor determines that the first synchronization event occurs, and the second processor resets the value of the first synchronization register to the first value. Then, the second processor may continue to execute the subsequent task, to ensure correct synchronization.

According to the synchronization method provided in this embodiment, the first synchronization object is created for the first synchronization event, so that the first synchronization event may correspond to the first synchronization register, and the AI accelerator may determine, based on the value of the synchronization register, whether the synchronization event corresponding to the synchronization register occurs. In this way, synchronization in an AI accelerator, among different AI accelerators in an AI server, and among AI servers can be implemented.

Figure 8:
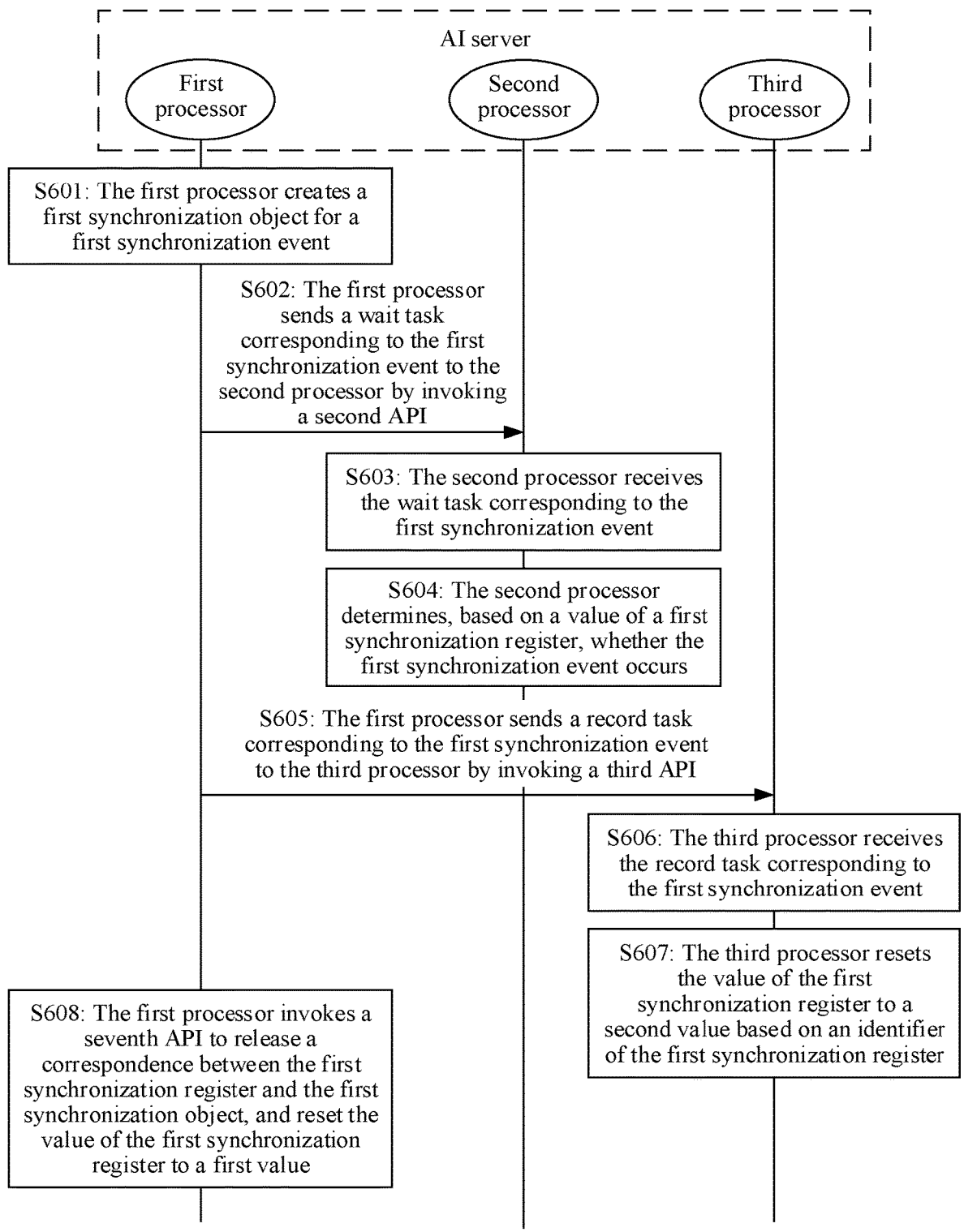
FIG. 8 is a schematic flowchart of another synchronization method according to an embodiment.

FIG. 8 is a synchronization method according to an embodiment. As shown in FIG. 8, the method may include the following steps.

S601: A first processor creates a first synchronization object for a first synchronization event.

In some embodiments, the first synchronization event may occur in an NPU, or may occur among different NPUs in an AI server.

It may be understood that, for a specific implementation of step S601, refer to step S301. Details are not described herein again.

S602: The first processor sends a wait task corresponding to a first synchronization event to a second processor by invoking a second API.

The second API is configured to deliver the wait task corresponding to the synchronization event. For example, the second API may be a NotifyWait (notify, stream) interface, and the interface is configured to wait for, in the stream, a synchronization event corresponding to a synchronization object to occur.

The wait task corresponding to the first synchronization event is used to wait for the first synchronization event to occur, and the wait task corresponding to the first synchronization event includes a first queue identifier and an identifier of a first synchronization register. The first queue identifier is an identifier of a queue in which the wait task is located. In other words, the wait task corresponding to the first synchronization event is a task in a first queue. In some embodiments, the first queue identifier may be an identifier of a stream in which the wait task is located.

For example, with reference to FIG. 6, as shown in FIG. 7A, for the synchronization event 1, the CPU delivers a wait task 1 to the NPU 0 by invoking NotifyWait (notify 1, queue 1), to indicate the NPU 0 to wait for, in the queue 1, the synchronization event 1 corresponding to notify 1 to occur.

For another example, with reference to FIG. 6, as shown in FIG. 7B, for the synchronization event 2, the CPU delivers a wait task 2 to the NPU 1 by invoking NotifyWait (notify 2, queue 1), to indicate the NPU 1 to wait for, in the queue 1, the synchronization event 2 corresponding to notify 2 to occur.

S603: The second processor receives the wait task corresponding to the first synchronization event.

S604: The second processor determines, based on a value of the first synchronization register, whether the first synchronization event occurs.

Optionally, after receiving the wait task corresponding to the first synchronization event, the second processor may read the value of the first synchronization register based on the identifier of the first synchronization register carried in the wait task. Different values of the first synchronization register are used to indicate whether the first synchronization event occurs. Therefore, the second processor determines, based on the value of the first synchronization register, whether the first synchronization event occurs.

It may be understood that, for a specific implementation of step S604, refer to step S302. Details are not described herein again.

For example, with reference to FIG. 6 and FIG. 7A, for the synchronization event 1, the CPU delivers a wait task 1 to the NPU 0 through NotifyWait. After receiving the wait task 1, the NPU 0 reads a value of the Reg 0 based on an identifier of the synchronization register Reg 0 in the wait task 1. If the value of the Reg 0 is 0, it indicates that the synchronization event 1 corresponding to notify 1 does not occur. In this case, the NPU 0 continues to wait for the synchronization event 1 to occur, and a controller of the NPU 0 always checks the value of the Reg 0. When the value of the Reg 0 changes from 0 to 1, it indicates that the synchronization event 1 corresponding to notify 1 occurs. The controller of the NPU 0 immediately detects the change in the value of the Reg 0, and determines that the synchronization event 1 occurs. The controller of the NPU 0 clears the value of the Reg 0 to 0.

For another example, with reference to FIG. 6 and FIG. 7A, for the synchronization event 1, the CPU delivers a wait task 1 to the NPU 0 through NotifyWait. After receiving the wait task 1, the NPU 0 reads a value of the Reg 0 based on an identifier of the synchronization register Reg 0 in the wait task 1. If the value of the Reg 0 is 1, the NPU 0 determines that the synchronization event 1 corresponding to notify 1 occurs, and the controller of the NPU 0 clears the value of the Reg 0 to 0.

In some embodiments, after the first synchronization event occurs, the second processor resets the value of the first synchronization register to the first value, so that the first synchronization register may continue to perform another synchronization operation. For example, if the synchronization event corresponding to the first synchronization object periodically occurs, the second processor may perform synchronization based on the value of the first synchronization register next time the synchronization event corresponding to the first synchronization object occurs.

S605: The first processor sends a record task corresponding to the first synchronization event to a third processor by invoking a third API.

The third processor may be an NPU, and the third processor and the second processor may be a same NPU or different NPUs in a same AI server.

The third API is configured to deliver the record task corresponding to the synchronization event. For example, the third API may be a NotifyRecord (notify, stream) interface, and the interface is configured to set occurrence of the synchronization event corresponding to the synchronization object in the stream.

The record task corresponding to the first synchronization event is used to indicate that the first synchronization event occurs. The record task corresponding to the first synchronization event includes a second queue identifier and the identifier of the first synchronization register. The second queue identifier is an identifier of a queue in which the record task corresponding to the first synchronization event is located. In other words, the record task corresponding to the first synchronization event is a task in a second queue. In some embodiments, the second queue identifier may be an identifier of a stream in which the record task is located.

In some embodiments, when the first synchronization event occurs in an AI accelerator, the second processor and the third processor are the same AI accelerator (for example, an NPU). In other words, the same AI accelerator executes both the wait task and the record task. When the first synchronization event occurs between two AI accelerators in an AI server, the second processor and the third processor are two different AI accelerators in the AI server. In other words, one AI accelerator executes the wait task, and the other AI accelerator executes the record task. In some embodiments, when the AI accelerator executes both the wait task and the record task, the wait task and the record task may be tasks in two streams respectively.

For example, with reference to FIG. 6, as shown in FIG. 7A, the first synchronization event is the synchronization event 1, and the synchronization event 1 occurs in an NPU. For the synchronization event 1, the second processor and the third processor are the same and are both the NPU 0. In other words, the NPU 0 executes both the wait task and the record task. The CPU delivers a record task 1 to the NPU 0 by invoking NotifyRecord (notify 1, queue 0), to indicate that the synchronization event 1 corresponding to the synchronization object notify 1 in the queue 0 of the NPU 0 occurs. In some embodiments, after the NPU 0 completes executing the computing task 01 and sends the execution result of the computing task 01 to the CPU, the CPU delivers the record task 1 to the NPU 0, to indicate that the synchronization event 1 corresponding to notify 1 occurs.

For another example, with reference to FIG. 6, as shown in FIG. 7B, the first synchronization event is the synchronization event 2, and the synchronization event 2 occurs among different NPUs in an AI server. For the synchronization event 2, the second processor is the NPU 1, the third processor is the NPU 0, and the CPU delivers a record task 2 to the NPU 0 by invoking NotifyRecord (notify 2, queue 2), to indicate the NPU 0 that the synchronization event 2 corresponding to the synchronization object notify 2 in the queue 2 occurs. In some embodiments, after the NPU 0 completes executing the computing task 3n and sends the execution result of the computing task 3n to the CPU, the CPU delivers the record task 2 to the NPU 0, to indicate that the synchronization event 2 corresponding to notify 2 occurs.

S606: The third processor receives the record task corresponding to the first synchronization event.

For example, the third processor receives the record task corresponding to the first synchronization event, and may learn that the first synchronization event occurs.

S607: The third processor resets the value of the first synchronization register to a second value based on the identifier of the first synchronization register.

Because the first synchronization event occurs, the third processor may reset the value of the first synchronization register to the second value based on the identifier of the first synchronization register in the record task corresponding to the first synchronization event, so that the value of the first synchronization register corresponds to an occurrence status of the first synchronization event.

For example, with reference to FIG. 6 and FIG. 7A, for the synchronization event 1, the NPU 0 may reset the value of the Reg 0 in the NPU 0 to 1 based on the identifier of the Reg 0, so that the controller of the NPU 0 may immediately detect a change in the value of the Reg 0, and the NPU 0 determines that the synchronization event 1 occurs and clears the value of the Reg 0 to 0.

For another example, with reference to FIG. 6 and FIG. 7B, for the synchronization event 2, the NPU 0 may reset the value of the Reg 1 in the NPU 1 to 1 based on the identifier of the Reg 1, so that the controller of the NPU 1 may immediately detect a change in the value of the Reg 1, and the NPU 1 determines that the synchronization event 2 occurs and clears the value of the Reg 1 to 0.

NotifyWait and NotifyRecord are in a one-to-one correspondence. After receiving the record task, the third processor learns that the synchronization event corresponding to the synchronization object occurs, and resets the value of the synchronization register corresponding to the synchronization object to 1. After receiving the wait task, the second processor reads the value of the synchronization register corresponding to the synchronization object. If the value of the synchronization register is 0, it is determined that the synchronization event does not occur, and the second processor continues to wait for the synchronization event to occur. Until the third processor sets the value of the synchronization register corresponding to the synchronization object to 1, the second processor immediately detects that the value of the synchronization register is 1. In this case, the second processor determines that the synchronization event occurs, and the second processor resets the value of the synchronization register to 0, so that the synchronization register can continue to perform another subsequent synchronization operation.

It should be noted that in the synchronization method provided in this embodiment, synchronization overheads are overheads of writing the register by the controller of the AI accelerator through a bus, and the synchronization overheads are relatively small. For example, by using the synchronization method provided in this embodiment, synchronization overheads of synchronization in an NPU are less than 50 ns, and synchronization overheads of synchronization among different NPUs in an AI server are less than 1 μs. In addition, a simple API interface is provided in this embodiment, and the interface is similar to a semaphore interface of a general OS and can greatly facilitate a developer to use the AI accelerator.

It may be understood that a specific execution sequence of steps S601 to S607 is not limited in this embodiment. FIG. 8 is merely an example for description.

In some embodiments, the method may further include step S608.

S608: The first processor invokes a seventh API, to release a correspondence between the first synchronization register and the first synchronization object, and reset the value of the first synchronization register to the first value.

The seventh API is configured to release the first synchronization register. For example, the seventh API may be NotifyDestroy (notify), and the interface may be configured to destroy a synchronization object notify, and release a synchronization register corresponding to the synchronization object.

For example, as shown in FIG. 6, the APP delivers a NotifyDestroy API to destroy the created synchronization object notify 1. The runtime invokes the interface of the NPU driver to release notify 1 on the NPU 0. The NPU driver recycles notify 1 on the NPU 0, and resets the value of the synchronization register Reg 0 corresponding to notify 1 to 0.

It may be understood that a synchronization register corresponding to a synchronization object can be recycled by destroying the synchronization object through NotifyDestroy, so that when synchronization needs to be performed subsequently, the synchronization register may be allocated to another synchronization event.

According to the synchronization method provided in this embodiment, a group of synchronization registers are disposed in an AI accelerator. Each register may correspond to one synchronization event, and different values of the register are used to indicate whether the synchronization event corresponding to the register occurs. When receiving a wait task, the AI accelerator reads a value of a corresponding synchronization register, so that when a synchronization event does not occur, the AI accelerator may always wait for the synchronization event to occur, and when the synchronization event occurs, the AI accelerator may reset the value of the synchronization register to the first value. When receiving a record task, the AI accelerator writes a value to the corresponding synchronization register to indicate that the synchronization event occurs, so that synchronization among AI accelerators that need to be synchronized can be accurately implemented. It may be understood that, according to the synchronization method provided in this embodiment, not only synchronization in an AI accelerator but also synchronization among different AI accelerators in an AI server may be implemented by using a synchronization register. In addition, the simple API interface is provided, and the synchronization overheads are relatively small, so that AI training efficiency can be improved.

Figure 9:
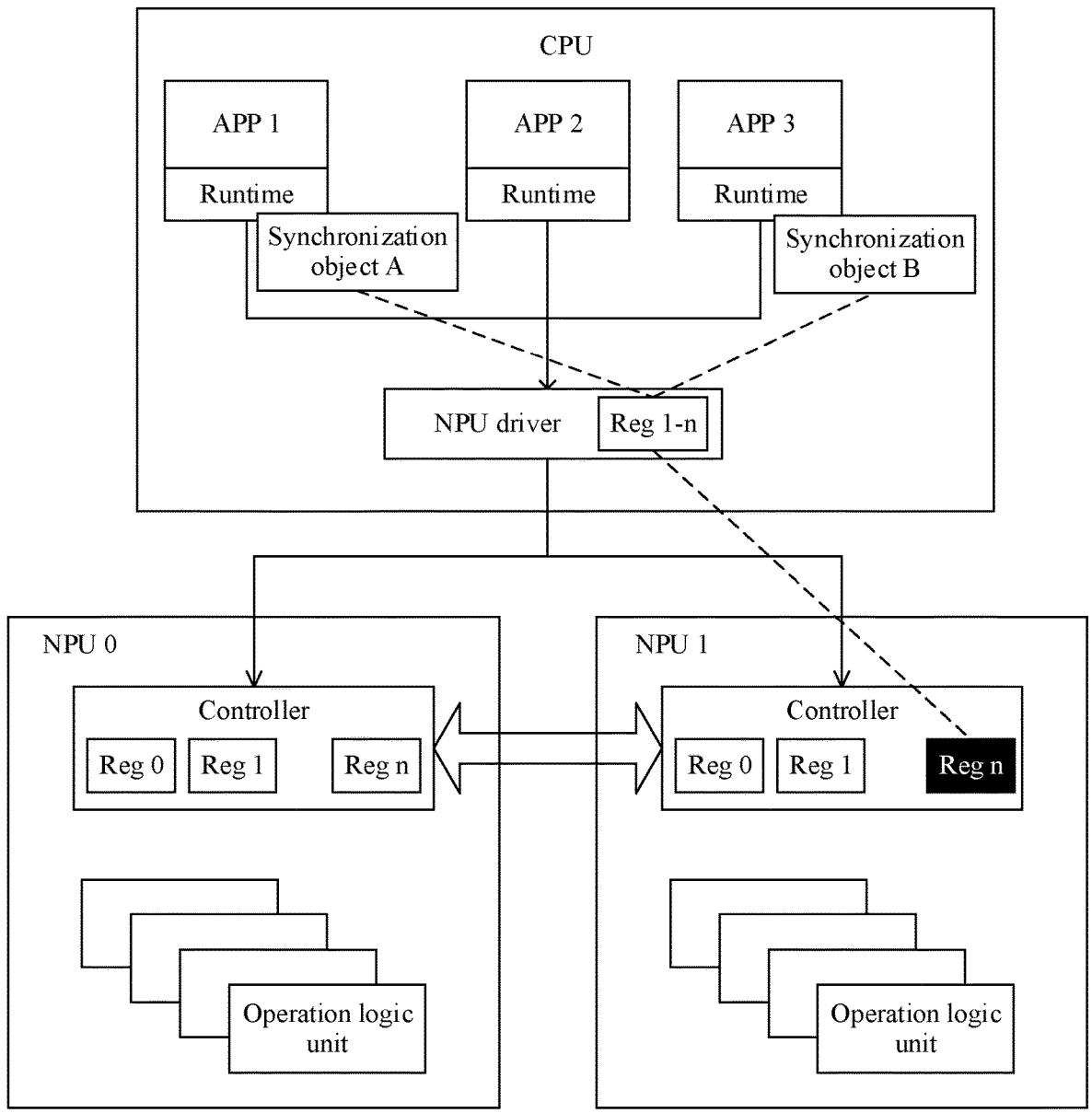
FIG. 9 is a schematic diagram of a structure of an inter-process synchronization computing architecture according to an embodiment.

In some embodiments, the first synchronization event may be a synchronization event of an APP or a synchronization event among different APPs. Regardless of whether the synchronization event is a synchronization event of an APP or a synchronization event among a plurality of APPs, the synchronization event may occur in an AI accelerator, or may occur among different AI accelerators in an AI server. However, when the first synchronization event is a synchronization event among a plurality of APPs, the plurality of APPs need to agree on a name of the synchronization object in advance, so as to implement inter-process synchronization. For example, as shown in FIG. 9, an example in which the first synchronization event is synchronization between an APP 1 and an APP 3 is used. When synchronization needs to be performed between the APP 1 and the APP 3, the APP 1 and the APP 3 may agree on a name of the synchronization object in advance, so as to implement synchronization among different processes.

Figure 10A:
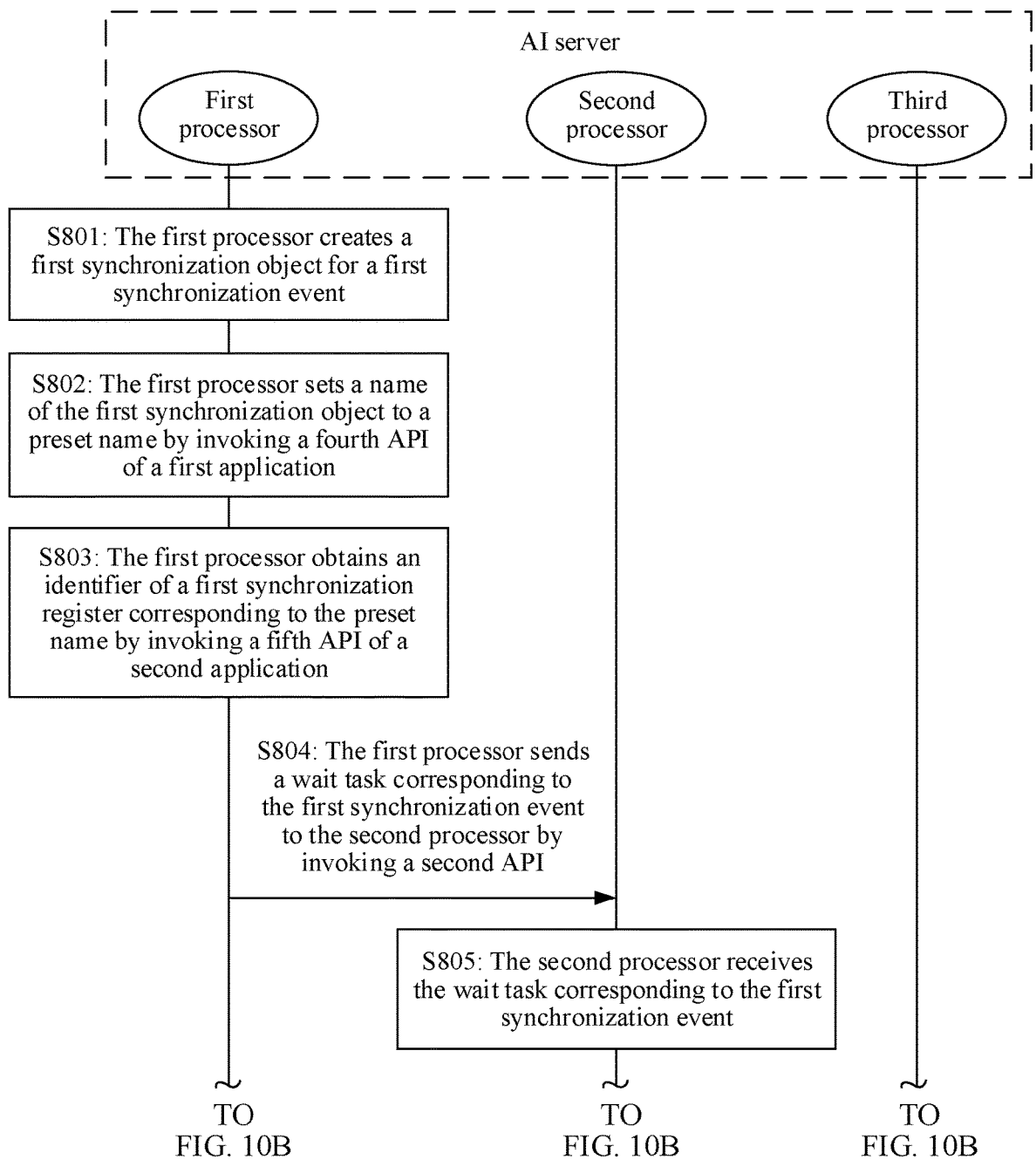
FIG. 10A and FIG. 10B are a schematic flowchart of another synchronization method according to an embodiment.
Figure 10B:
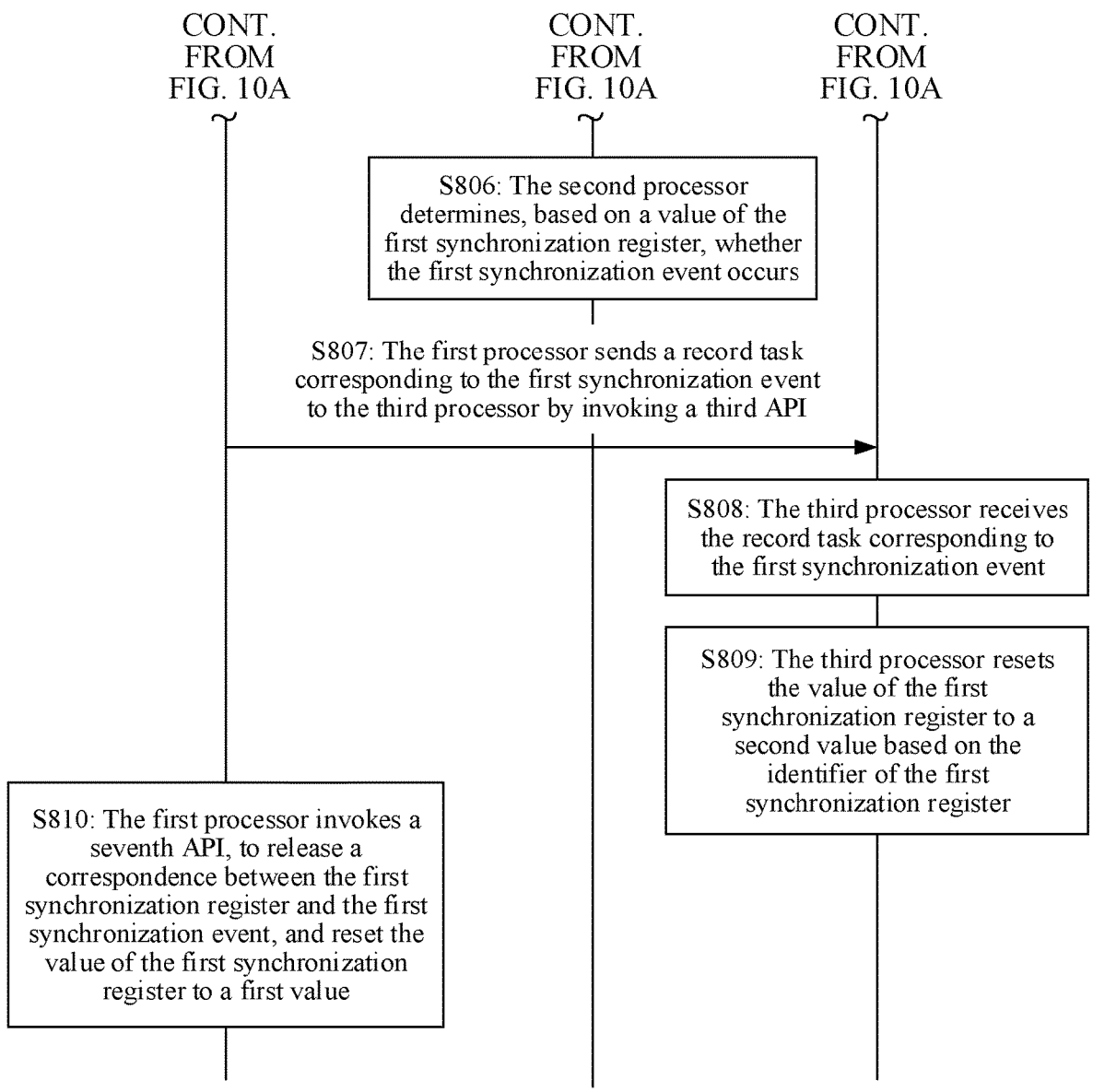

An embodiment further provides a synchronization method. As shown in FIG. 10A and FIG. 10B, in this embodiment, a first synchronization event is an inter-process synchronization event, and the method includes the following steps.

S801: A first processor creates a first synchronization object for the first synchronization event.

The first synchronization event is an inter-process synchronization event. The first synchronization event may occur in an AI accelerator, or may occur among different AI accelerators in an AI server.

It may be understood that, for a specific implementation of step S801, refer to a specific implementation of step S301. Details are not described herein again.

S802: The first processor sets a name of the first synchronization object to a preset name by invoking a fourth API of a first application.

The fourth API is configured to set a global name of the synchronization object. For example, the fourth API may be IpcSetNotifyName (notify, name), and is configured to set a global name of a synchronization object notify.

In some embodiments, the first synchronization event may be synchronization between the first application and a second application, and the preset name is a name agreed upon in advance by the first application and the second application.

For example, the first synchronization event is synchronization between the APP 1 and the APP 3, and a name, of the synchronization object, that is agreed upon in advance by the APP 1 and the APP 3 is NotifyForTest1. As shown in FIG. 9, the APP 1 may create a synchronization object A by invoking a NotifyCreate interface. The synchronization object A may be denoted as notify A. An NPU driver allocates a synchronization register Reg n of an NPU 1 to runtime of the APP 1, and notify A stores an identifier of the synchronization register Reg n. In FIG. 9, an example in which the identifier of the synchronization register Reg n is 1-n is used for description. The APP 1 invokes an IpcSetNotifyName interface to set notify A as a synchronization object for inter-process communication (IPC). The NPU driver labels a name of the synchronization object notify A as NotifyForTest1.

S803: The first processor obtains an identifier of the first synchronization register corresponding to the preset name by invoking a fifth API of the second application.

The fifth API is configured to obtain the identifier of the register corresponding to the preset name. For example, the fifth API may be IpcOpenNotify (notify, name), and is configured to open the synchronization object notify based on a global name of the synchronization object.

For example, the first synchronization event is synchronization between the APP 1 and the APP 3, and the name, of the synchronization object, that is agreed upon in advance by the APP 1 and the APP 3 is NotifyForTest1. As shown in FIG. 9, the APP 3 invokes IpcOpenNotify, and runtime invokes an interface of the NPU driver, to transfer NotifyForTest1 into the NPU driver. The NPU driver finds the synchronization object notify A based on NotifyForTest1 and returns the identifier Reg 1-n of the synchronization register in notify A to the runtime. The runtime creates a synchronization object B for the APP 3. The synchronization object B can be denoted as notify B, and notify B stores the identifier Reg 1-n of the synchronization register. In this way, the same synchronization register Reg 1-n may separately correspond to notify A of the APP 1 and notify B of the APP 3. The APP 1 and the APP 3 may then perform synchronization by using the NotifyRecord and NotifyWait interfaces.

S804: The first processor sends a wait task corresponding to the first synchronization event to a second processor by invoking a second API.

For example, as shown in FIG. 9, the APP 1 may invoke the NotifyWait (notify A, queue 1) interface to deliver a wait task to the NPU 1, to indicate the NPU 1 to wait for, in the queue 1, the synchronization event corresponding to notify A to occur.

S805: The second processor receives the wait task corresponding to the first synchronization event.

S806: The second processor determines, based on a value of the first synchronization register, whether the first synchronization event occurs.

For example, with reference to FIG. 9, the CPU delivers a wait task to the NPU 1 through NotifyWait. After receiving the wait task, the NPU 1 reads a value of the Reg 1-n based on the identifier of the synchronization register Reg 1-n in the wait task. If the value of the Reg 1-n is 0, it indicates that the synchronization event corresponding to notify A does not occur. In this case, the NPU 1 keeps waiting, and a controller of the NPU 1 always checks the value of the Reg 1-n. When the value of the Reg 1-n changes from 0 to 1, it indicates that the synchronization event corresponding to notify A occurs. The controller of NPU 1 immediately detects the change in the value of the Reg 1-n, and the controller of the NPU 1 stops waiting and clears the value of the Reg 1-n to 0.

S807: The first processor sends a record task corresponding to the first synchronization event to a third processor by invoking a third API.

In some embodiments, when the first synchronization event occurs in an AI accelerator, the third processor and the second processor are the same AI accelerator. When the first synchronization event occurs among different AI accelerators in an AI server, the third processor and the second processor are two different AI accelerators in the AI server. In the following embodiment, an example in which the first synchronization event occurs among different AI accelerators in an AI server is used for description.

For example, as shown in FIG. 9, an APP 2 may invoke a NotifyRecord (notify B, queue 0) interface to deliver a record task to an NPU 0, to indicate the NPU 0 that a synchronization event corresponding to the synchronization object notify B in the queue 0 occurs.

S808: The third processor receives the record task corresponding to the first synchronization event.

S809: The third processor resets the value of the first synchronization register to a second value based on the identifier of the first synchronization register.

For example, as shown in FIG. 9, the NPU 0 may reset the value of the Reg 1-n in the NPU 1 to 1 based on the identifier of the Reg 1-n, so that the controller of the NPU 1 may immediately detect the change in the value of the Reg 1-n, and the controller of the NPU 1 stops waiting and clears the value of the Reg 1-n to 0.

It may be understood that, for specific implementations of steps S804 to S809, refer to the implementations of steps S602 to S607 in the foregoing embodiments. Details are not described herein again.

It may be understood that a specific execution sequence of steps S801 to S809 is not limited in this embodiment. FIG. 10A and FIG. 10B are merely an example for description.

In some embodiments, the method may further include step S810.

S810: The first processor invokes a seventh API, to release a correspondence between the first synchronization register and the first synchronization event, and reset the value of the first synchronization register to a first value.

It may be understood that, for a specific implementation of step S810, refer to step S608. Details are not described herein again.

According to the synchronization method provided in this embodiment, a group of registers used for synchronization are disposed in an AI accelerator, and each register may be configured to correspond to one synchronization event. Different values of the register are used to indicate whether the synchronization event corresponding to the register occurs. In addition, when the synchronization event is for inter-process synchronization, a global name of the synchronization event is preset, so that the synchronization event among different processes can correspond to the same register, so as to implement inter-process synchronization.

Figure 11A:
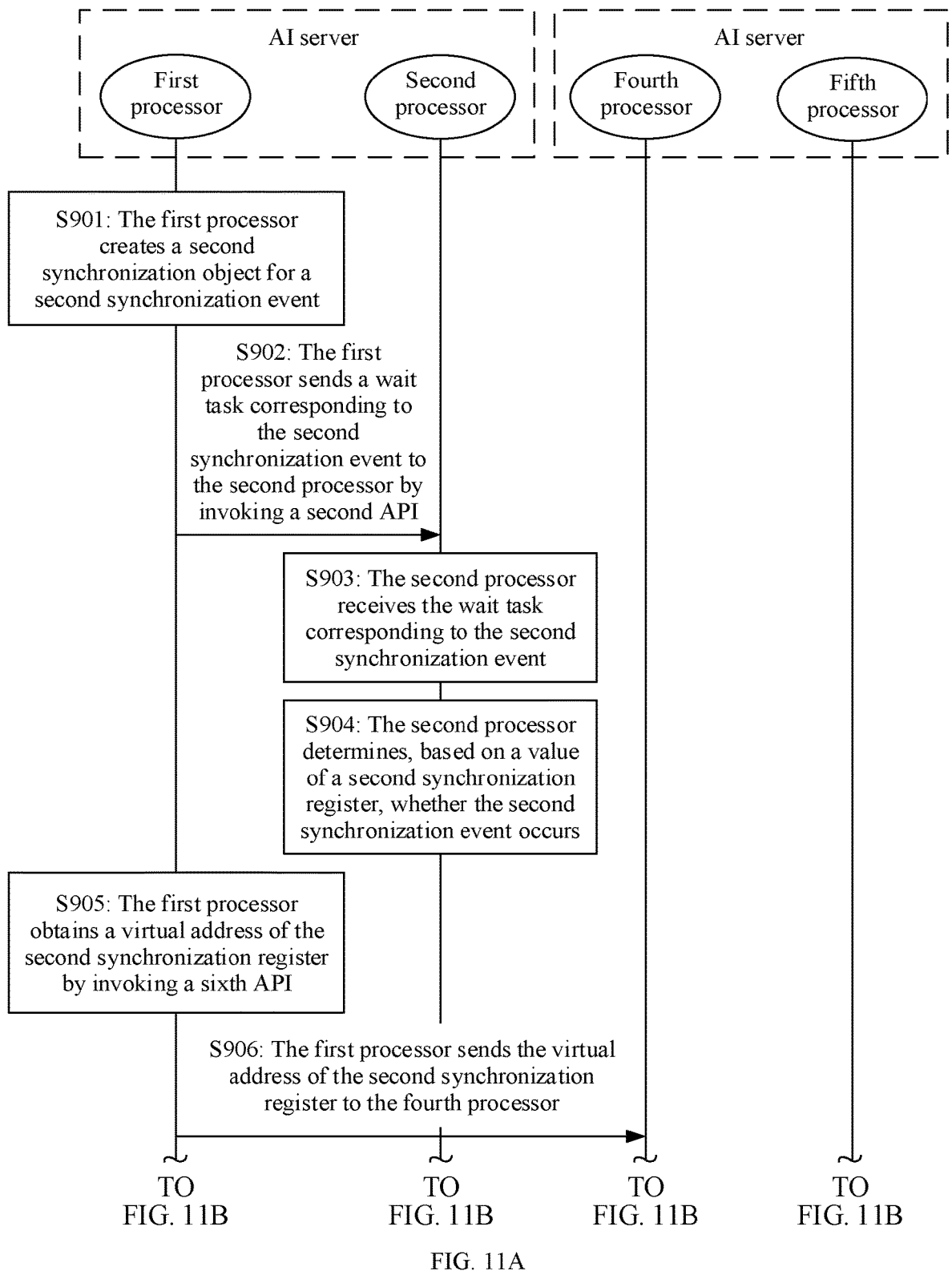
FIG. 11A and FIG. 11B are a schematic flowchart of another synchronization method according to an embodiment.
Figure 11B:
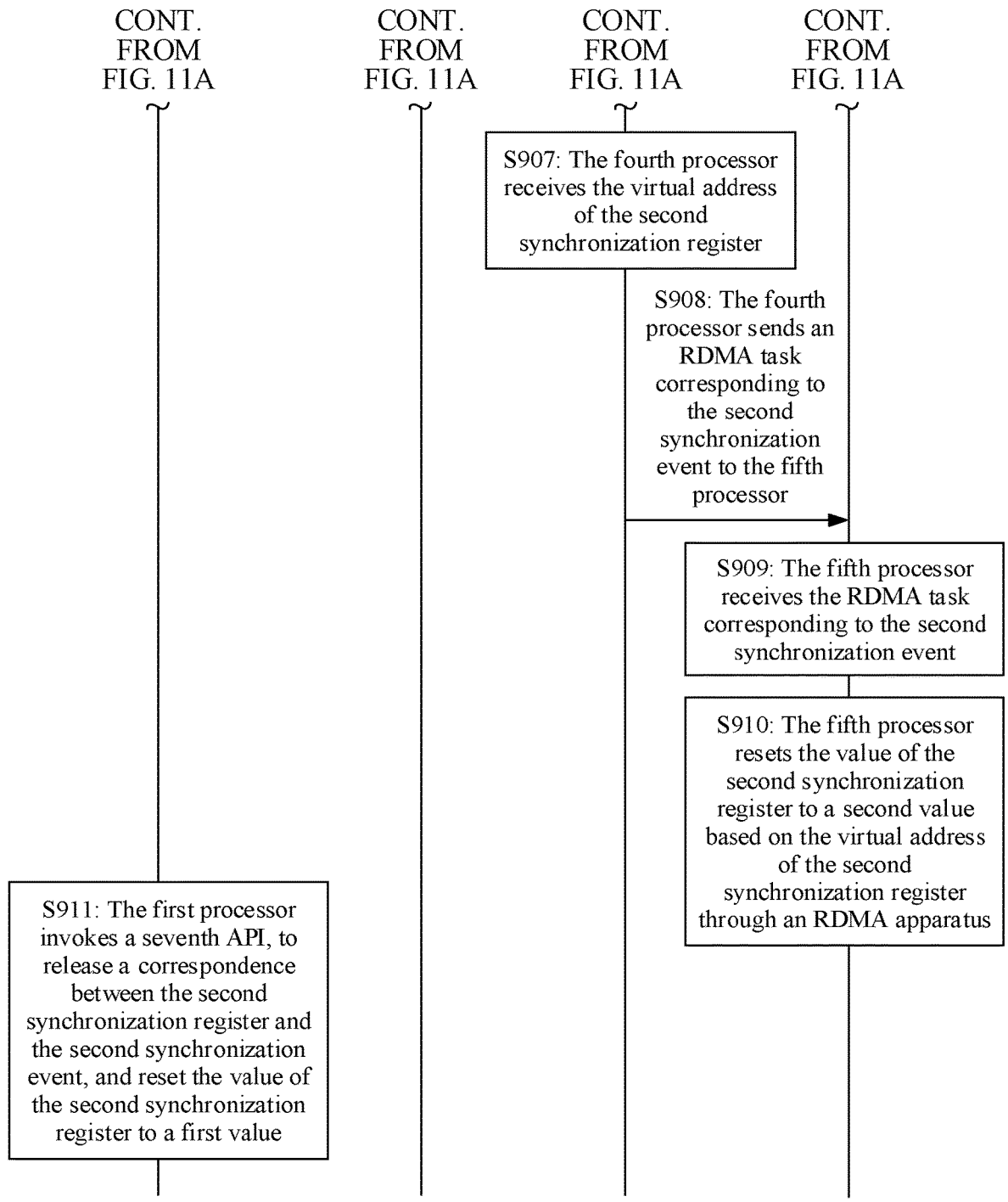

An embodiment further provides a chip synchronization method. In this embodiment, a second synchronization event occurs among different AI servers. As shown in FIG. 11A and FIG. 11B, the method includes the following steps.

S901: A first processor creates a second synchronization object for a second synchronization event.

It may be understood that, for a specific implementation of step S901, refer to step S301. Details are not described herein again.

The second synchronization event is a synchronization event among different AI servers.

Figure 12:
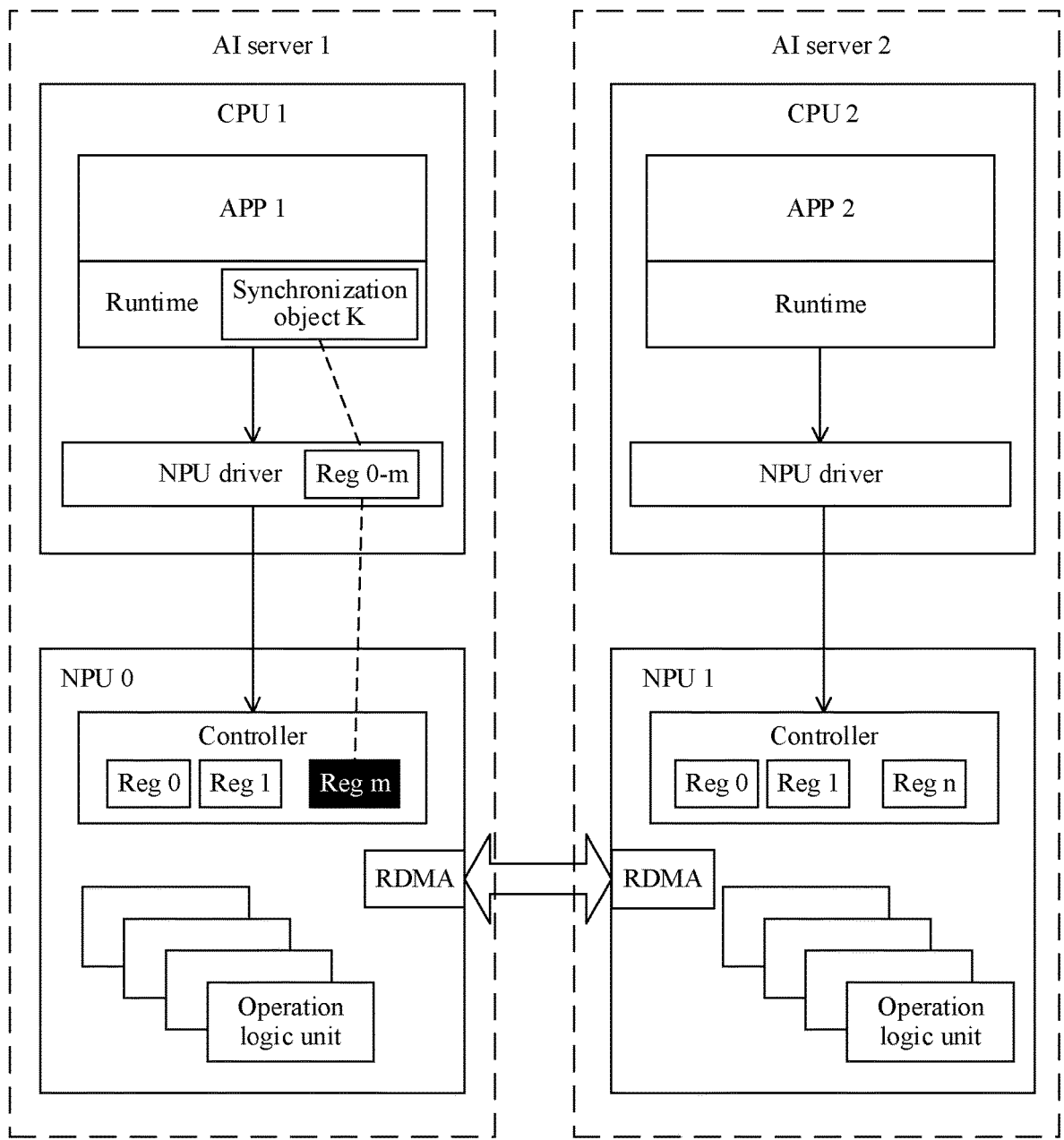
FIG. 12 is a schematic diagram of a structure of a computing architecture for synchronization between AI servers according to an embodiment.

For example, the second synchronization event is synchronization between an AI server 1 and an AI server 2. As shown in FIG. 12, an APP 1 runs on the AI server 1, an APP 2 runs on the AI server 2, the APP 1 and the APP 2 need to be synchronized. The APP 1 waits for the APP 2 to transmit data to the APP 1. After data transmission is completed, the APP 2 notifies the APP 1 that the transmission is completed, and indicates the APP 1 to execute a subsequent task. For the synchronization, a CPU 1 may allocate a synchronization register Reg m in a plurality of synchronization registers included in an NPU 0 of the AI server 1 to the synchronization event, and store an identifier Reg 0-$m$ of the synchronization register Reg m in a synchronization object K. The synchronization object K may be denoted as notify K. For example, the CPU 1 of the AI server 1 may create the synchronization object notify K by invoking a NotifyCreat interface. The synchronization object notify K stores the identifier Reg 0-$m$ of the synchronization register allocated by an NPU driver to the synchronization event.

S902: The first processor sends a wait task corresponding to the second synchronization event to a second processor by invoking a second API.

The first processor and the second processor are processors in a same AI server. For example, as shown in FIG. 12, the first processor may be the CPU 1 in the AI server 1, and the second processor may be the AI accelerator NPU 0 in the AI server 1.

S903: The second processor receives the wait task corresponding to the second synchronization event.

S904: The second processor determines, based on a value of a second synchronization register, whether the second synchronization event occurs.

It may be understood that, for specific implementations of steps S902 to S904, refer to specific implementations of steps S602 to S604. Details are not described herein again.

S905: The first processor obtains a virtual address of the second synchronization register by invoking a sixth API.

The sixth API is configured to obtain the virtual address of the register corresponding to the synchronization object. For example, the sixth API may be NotifyGetAddr (notify, addr), where an input is a synchronization object notify, and an output is a virtual address of a synchronization register corresponding to the synchronization object notify.

For example, as shown in FIG. 12, during synchronization among the AI servers, the APP 1 maps, by invoking the NotifyGetAddr interface, a physical address of a synchronization register Reg 0-$m$ corresponding to the synchronization object notify K to a virtual address (VA) of the APP 1, and the virtual address is denoted as a VA 1. For example, the APP 1 invokes the NotifyGetAddr interface of runtime and transfers the synchronization object notify K into the runtime. The runtime obtains the identifier of the synchronization register Reg 0-$m$ based on the synchronization object notify K. The NPU driver obtains the physical address of the synchronization register based on the identifier of the synchronization register Reg 0-$m$, and maps the physical address to the virtual address of the APP 1. The NPU driver returns the virtual address to the runtime, and the runtime returns the virtual address to the APP, to complete a virtual address mapping process of the synchronization register.

In some embodiments, a specific implementation of mapping the physical address of the synchronization register to the virtual address is not limited in this embodiment. For details, refer to the conventional technology. Details are not described herein again.

S906: The first processor sends the virtual address of the second synchronization register to a fourth processor.

The fourth processor may be a central control unit in an AI server, for example, a CPU. The fourth processor includes a second CPU.

The first processor and the fourth processor are processors in different AI servers. In some embodiments, the first processor and the fourth processor may be CPUs in different AI servers.

For example, as shown in FIG. 12, the first processor may be the CPU 1 in the AI server 1, and the fourth processor may be a CPU 2 in the AI server 2. The CPU 1 in the AI server 1 sends the virtual address VA 1 of the synchronization register Reg 0-$m$ corresponding to the synchronization object notify K to the CPU 2 in the AI server 2.

S907: The fourth processor receives the virtual address of the second synchronization register.

S908: The fourth processor sends a remote direct memory access (RDMA) task corresponding to the second synchronization event to a fifth processor.

The RDMA task corresponding to the second synchronization event is used to indicate that the second synchronization event occurs, and the RDMA task corresponding to the second synchronization event includes the virtual address of the second synchronization register.

The fourth processor and the fifth processor are processors in a same AI server. The fourth processor may be a CPU in the AI server, and the fifth processor may be an AI accelerator (for example, an NPU) in the AI server.

For example, as shown in FIG. 12, the fourth processor is the CPU 2 in the AI server 2, and the fifth processor may be an NPU 1 in the AI server 2. The CPU 2 may deliver an RDMA task to the NPU 1 by invoking RDMAsend (VA 1, 1).

In some embodiments, the fourth processor may send the RDMA task corresponding to the second synchronization event to the fifth processor by invoking an eighth API. The eighth API is configured to deliver the RDMA task corresponding to the synchronization event. For example, the eighth API is RDMAsend (addr, 1), and is configured to indicate to write a second value 1 to a virtual address addr.

S909: The fifth processor receives the RDMA task corresponding to the second synchronization event.

S910: The fifth processor resets the value of the second synchronization register to a second value based on the virtual address of the second synchronization register through an RDMA apparatus.

Because the second synchronization event occurs, the fifth processor may reset the value of the second synchronization register to the second value based on the virtual address of the second synchronization register in the RDMA task corresponding to the second synchronization event, so that the value of the second synchronization register corresponds to an occurrence status of the second synchronization event.

For example, with reference to FIG. 12, the NPU 1 in the AI server 2 may reset a value of the Reg 0-$m$ in the NPU 0 to 1 based on the VA 1, so that a controller of the NPU 0 may immediately detect a change in the value of the Reg 0-$m$, and the controller of the NPU 0 stops waiting and clears the value of the Reg 0-$m$ to 0.

NotifyWait and RDMAsend are in a one-to-one correspondence. After receiving the RDMAsend task, the fifth processor learns that the synchronization event corresponding to the synchronization object occurs, and resets the value of a synchronization register corresponding to the synchronization object to 1 through the RDMA apparatus. After receiving the wait task, the second processor reads the value of the synchronization register corresponding to the synchronization object. If the value of the synchronization register is 0, it is determined that the synchronization event does not occur, and the second processor keeps waiting. Until the fifth processor sets the value of the synchronization register corresponding to the synchronization object to 1, the second processor detects that the value of the synchronization register is 1, and determines that the synchronization event occurs. In this case, the second processor stops waiting, and resets the value of the synchronization register to 0, so that the synchronization register can continue to perform another subsequent synchronization operation.

It should be noted that an execution sequence of steps S901 to S910 is not limited in this embodiment. FIG. 11A and FIG. 11B are merely an example for description.

According to the synchronization method in this embodiment, for synchronization among AI servers, synchronization overheads are only time overheads of network communication, and there is no other additional overhead. Therefore, the synchronization overheads are relatively small. In addition, a simple API interface is provided in this embodiment, and the interface is similar to a semaphore interface of a general OS and can greatly facilitate a developer to use an AI accelerator.

In some embodiments, the method may further include step S911.

S911: The first processor invokes a seventh API, to release a correspondence between the second synchronization register and the second synchronization event, and reset the value of the second synchronization register to a first value.

It may be understood that, for a specific implementation of step S911, refer to step S608. Details are not described herein again.

According to the synchronization method provided in this embodiment, a group of synchronization registers are disposed in the AI accelerator. Each register may correspond to one synchronization object, and different values of the register are used to indicate whether a synchronization event corresponding to the synchronization object occurs. When receiving a wait task, the AI accelerator reads a value of a corresponding synchronization register, so that the AI accelerator may keep waiting when a synchronization event does not occur and stop waiting when the synchronization event occurs. When receiving an RDMA task, the AI accelerator writes a value to a synchronization register corresponding to a virtual address to indicate that a synchronization event occurs, so that synchronization among AI accelerators that need to be synchronized can be accurately implemented. In addition, according to this solution, a physical address of a synchronization register is converted into a virtual address, and a value is written to the virtual address through RDMA, so that synchronization among different nodes (AI servers) can be implemented. In addition, the simple API interface is provided, and the synchronization overheads are relatively small, so that AI training efficiency is improved.

Figure 13A:
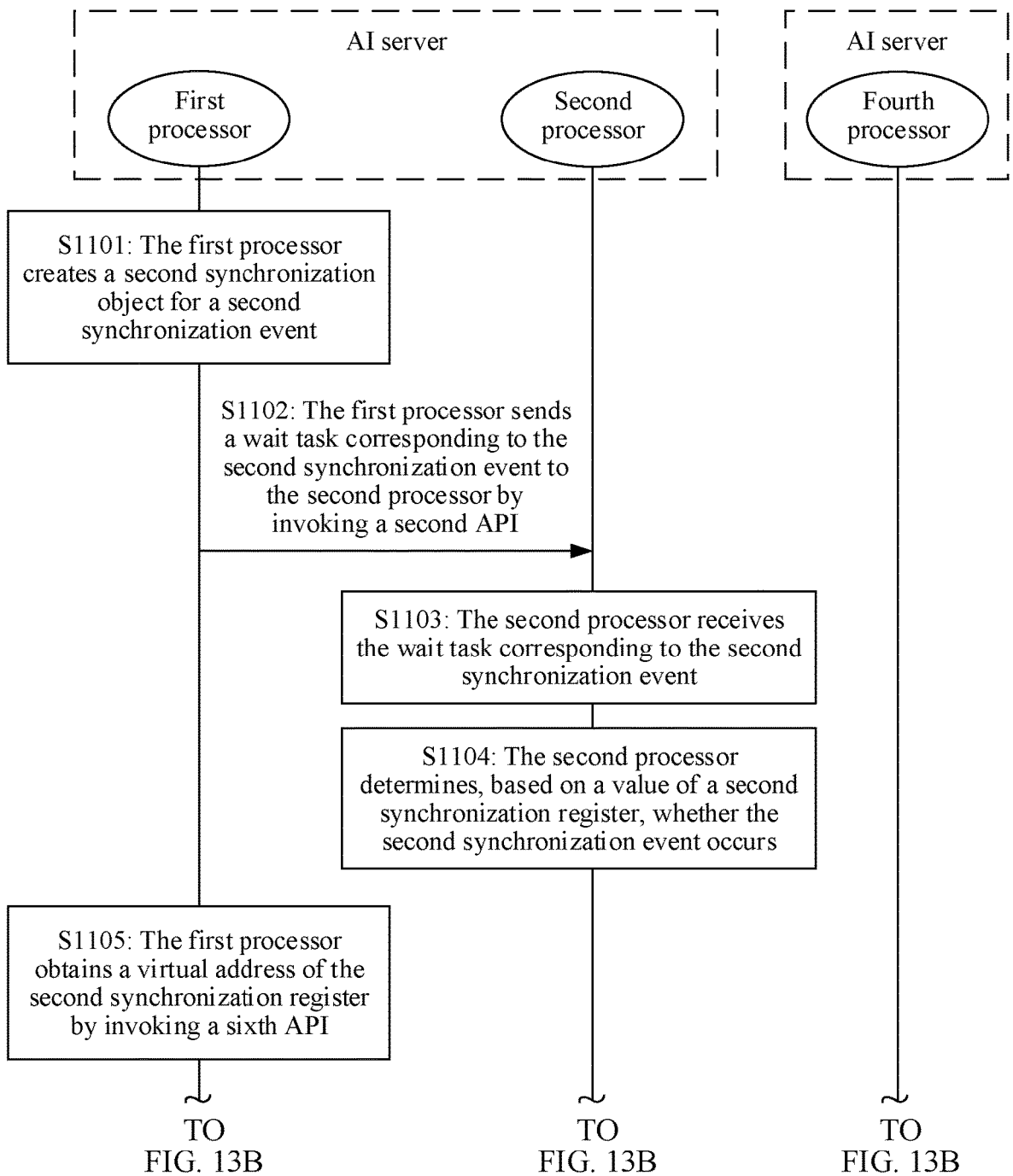
FIG. 13A and FIG. 13B are a schematic flowchart of another synchronization method according to an embodiment.
Figure 13B:
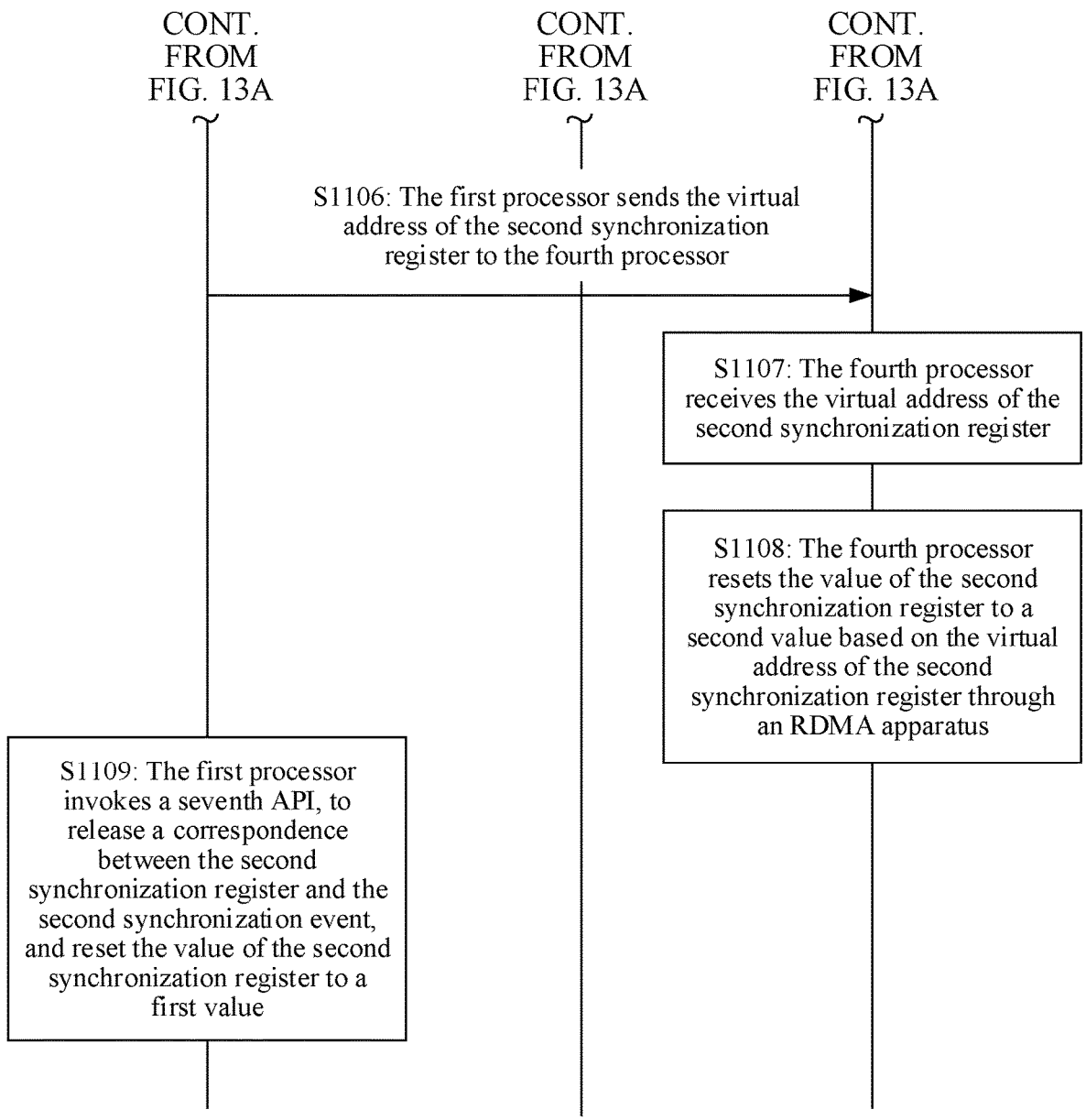

An embodiment further provides a chip synchronization method. As shown in FIG. 13A and FIG. 13B, in this embodiment, a second synchronization event occurs among AI servers, and the method includes the following steps.

S1101: A first processor creates a second synchronization object for the second synchronization event.

S1102: The first processor sends a wait task corresponding to the second synchronization event to a second processor by invoking a second API.

S1103: The second processor receives the wait task corresponding to the second synchronization event.

S1104: The second processor determines, based on a value of a second synchronization register, whether the second synchronization event occurs.

S1105: The first processor obtains a virtual address of the second synchronization register by invoking a sixth API.

S1106: The first processor sends the virtual address of the second synchronization register to a fourth processor.

S1107: The fourth processor receives the virtual address of the second synchronization register.

It may be understood that, for specific implementations of steps S1101 to S1107, refer to implementations of the foregoing steps. Details are not described herein again.

S1108: The fourth processor resets the value of the second synchronization register to a second value based on the virtual address of the second synchronization register through an RDMA apparatus.

For example, as shown in FIG. 12, when the second synchronization event occurs between the AI server 1 and the AI server 2, after the CPU 2 of the AI server 2 receives the virtual address VA 1 of the synchronization register Reg 0-*m*, the CPU 2 may directly reset the value of the second synchronization register to the second value through the RDMA apparatus when the second synchronization event occurs. The CPU 2 of the AI server 2 does not need to send an RDMA task to the NPU 1 as in the embodiment shown in FIG. 11A and FIG. 11B. Then, the NPU 1 resets the value of the second synchronization register to the second value through the RDMA apparatus. It may be understood that, after the CPU 2 resets the value of the synchronization register Reg 0-*m* to 1 through the RDMA apparatus when the second synchronization event occurs, the controller of the NPU 0 may immediately detect a change in the value of the Reg 0-*m*. The controller of the NPU 0 stops waiting, and clears the value of the Reg 0-*m* to 0, to implement accurate synchronization among the AI servers.

It should be noted that an execution sequence of steps S1101 to S1108 is not limited in this embodiment. FIG. 13A and FIG. 13B are merely an example for description.

In some embodiments, the method may further include step S1109.

S1109: The first processor invokes a seventh API, to release a correspondence between the second synchronization register and the second synchronization event, and reset the value of the second synchronization register to a first value.

It may be understood that, for a specific implementation of step S1109, refer to step S608. Details are not described herein again.

According to the synchronization method provided in this embodiment, a group of synchronization registers are disposed in an AI accelerator. Each register may correspond to one synchronization object, and different values of the register are used to indicate whether a synchronization event corresponding to the synchronization object occurs. When receiving a wait task, the AI accelerator reads a value of a corresponding synchronization register, so that the AI accelerator may keep waiting when a synchronization event does not occur and stop waiting when the synchronization event occurs. When the synchronization event occurs, the processor directly writes a value to a synchronization register based on a virtual address of the synchronization register, to indicate that the synchronization event occurs, so that synchronization can be accurately implemented among AI servers that need to be synchronized.

It should be noted that an APP to which the first API to the eighth API belong is not limited in this embodiment. In actual application, each APP may invoke one or more of the foregoing APIs based on a service requirement of the APP, to implement synchronization in an AI accelerator, among different AI accelerators in an AI server, or among AI servers.

An embodiment further provides a chip. The chip includes the foregoing first processor and an interface circuit. The first processor is configured to communicate with another apparatus through the interface circuit, to implement the synchronization method shown in FIG. 5, FIG. 8, FIG. 10A and FIG. 10B, FIG. 11A and FIG. 11B, or FIG. 13A and FIG. 13B. In some embodiments, the chip may further include a memory, and the memory is configured to store computer instructions.

An embodiment further provides a chip. The chip includes the foregoing second processor and an interface circuit. The second processor is configured to communicate with another apparatus through the interface circuit, to implement the synchronization method shown in FIG. 5, FIG. 8, FIG. 10A and FIG. 10B, FIG. 11A and FIG. 11B, or FIG. 13A and FIG. 13B.

An embodiment further provides a chip. The chip includes the foregoing third processor and an interface circuit. The third processor is configured to communicate with another apparatus through the interface circuit, to implement the synchronization method shown in FIG. 8 or FIG. and FIG. 10B.

An embodiment further provides a chip. The chip includes the foregoing fourth processor and an interface circuit. The fourth processor is configured to communicate with another apparatus through the interface circuit, to implement the synchronization method shown in FIG. 11A and FIG. 11B or FIG. 13A and FIG. 13B.

An embodiment further provides a chip. The chip includes the foregoing fifth processor and an interface circuit. The fifth processor is configured to communicate with another apparatus through the interface circuit, to implement the synchronization method shown in FIG. 13A and FIG. 13B.

An embodiment further provides an AI server. The AI server includes the first processor, the second processor, and an interface circuit. The first processor communicates with the second processor through the interface circuit, to implement the synchronization method shown in FIG. 5, FIG. 8, FIG. 10A and FIG. 10B, FIG. 11A and FIG. 11B, or FIG. 13A and FIG. 13B.

An embodiment further provides an AI server. The AI server includes the first processor, the second processor, the third processor, and an interface circuit. The first processor, the second processor, and the third processor communicate with each other through the interface circuit, to implement the synchronization method shown in FIG. 8 or FIG. 10A and FIG. 10B.

An embodiment further provides an AI server. The AI server includes the fourth processor, the fifth processor, and an interface circuit. The fourth processor communicates with the fifth processor through the interface circuit, to implement the synchronization method shown in FIG. 11A and FIG. 11B.

An embodiment provides an AI cluster. The AI cluster includes a plurality of AI servers, and the AI server includes a CPU and one or more AI accelerators. The CPU may include the first processor, and the AI accelerator may include at least one of the second processor or the third processor.

An embodiment provides an AI cluster. The AI cluster includes a plurality of AI servers, and the AI server includes a CPU and one or more AI accelerators. The CPU may include the fourth processor, and the AI accelerator may include the fifth processor.

An embodiment provides a communications system. The communications system includes at least one of the foregoing AI accelerator, the foregoing AI server, or the foregoing AI cluster.

An embodiment provides an API. The API is deployed in a processor, and the API is configured to create a synchronization object for a synchronization event. In some embodiments, the API may be NotifyCreat (deviceID, notify), where an input deviceID is an ID of an AI accelerator, and an output notify is a synchronization object.

An embodiment provides an API. The API is deployed in a processor, and the API is configured to deliver a wait task corresponding to a synchronization event. In some embodiments, the API may be a NotifyWait (notify, stream) interface, and the interface is configured to wait for, in the stream, a synchronization event corresponding to a synchronization object to occur.

An embodiment provides an API. The API is deployed in a processor, and the API is configured to deliver a record task corresponding to a synchronization event. In some embodiments, the API may be a NotifyRecord (notify, stream) interface, and the interface is configured to set occurrence of a synchronization event corresponding to a synchronization object in the stream.

An embodiment provides an API. The API is deployed in a processor, and the API is configured to set a global name of a synchronization object. In some embodiments, the API may be IpcSetNotifyName (notify, name), and is configured to set a global name of a synchronization object notify.

An embodiment provides an API. The API is deployed in a processor, and the API is configured to open a synchronization object. In some embodiments, the API may be IpcOpenNotify (notify, name), and is configured to open a synchronization object notify based on a global name of the synchronization object.

An embodiment provides an API. The API is deployed in a processor, and the API is configured to obtain a virtual address of a register corresponding to a synchronization object. In some embodiments, the API may be NotifyGetAddr (notify, addr), where an input is a synchronization object notify, and an output is a virtual address of a synchronization register corresponding to the synchronization object notify.

An embodiment provides an API. The API is deployed in a processor, and the API is configured to release a synchronization register. In some embodiments, the API may be NotifyDestroy (notify), and the interface may be configured to destroy a synchronization object notify, and release a synchronization register corresponding to the synchronization object.

An embodiment provides an API. The API is deployed in a processor, and the API is configured to deliver an RDMA task corresponding to a synchronization event. In some embodiments, the API may be RDMAsend (addr, 1), and is configured to indicate to write a second value 1 to a virtual address addr.

An embodiment further provides a computer-readable storage medium. The computer-readable storage medium stores computer program code. When the foregoing processor executes the computer program code, an electronic device performs the synchronization method shown in FIG. 5, FIG. 8, FIG. 10A and FIG. 10B, FIG. 11A and FIG. 11B, or FIG. 13A and FIG. 13B.

An embodiment further provides a computer program product. When the computer program product runs on a computer, the computer is enabled to perform the synchronization method shown in FIG. 5, FIG. 8, FIG. 10A and FIG. 10B, FIG. 11A and FIG. 11B, or FIG. 13A and FIG. 13B.

The method or algorithm steps described with reference to the content disclosed may be implemented by hardware, or may be implemented by a processor by executing software instructions. The software instructions may include a corresponding software module. The software module may be stored in a random-access memory (RAM), a flash memory, an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information to the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

Persons skilled in the art should be aware that in the foregoing one or more examples, functions described in the present disclosure may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communications medium. The communications medium includes any medium that enables a computer program to be transmitted from one place to another. The storage medium may be any available medium accessible to a general-purpose or dedicated computer.

The objectives, technical solutions, and benefits of the present disclosure are further described in detail in the foregoing specific implementations. It should be understood that the foregoing descriptions are merely specific implementations, but are not intended to limit the protection scope of the present disclosure. Any modification, equivalent replacement, or improvement made based on the technical solutions of the present disclosure shall fall within the protection scope of the present disclosure.

What is claimed is:

1. A method comprising:
    creating, by a first processor, a first synchronization object for a first synchronization event, wherein the first synchronization object comprises a synchronization register identifier of a first synchronization register, and wherein a value of the first synchronization register comprises a first value indicating the first synchronization event has not occurred or a second value indicating the first synchronization event has occurred;
    determining, by a second processor based on the value, whether the first synchronization event has occurred;
    sending, by the first processor and to the second processor by invoking an application programming interface (API), a wait task that corresponds to the first synchronization event, is for waiting for the first synchronization event to occur, and comprises the synchronization register identifier and a first queue identifier of a queue in which the wait task is located; and
    receiving, by the second processor and from the first processor, the wait task.

2. The method of claim 1, wherein creating the first synchronization object comprises allocating, by the first processor, the first synchronization register from among a plurality of synchronization registers in the second processor to the first synchronization event by invoking the API and storing the synchronization register identifier in the first synchronization object.

3. The method of claim 1, wherein determining whether the first synchronization event has occurred comprises determining, by the second processor when the value is the first value, that the first synchronization event has not occurred, and wherein the method further comprises:
    waiting, by the second processor, for the first synchronization event to occur; and
    resetting, by the second processor when the first synchronization event occurs, the value to the first value.

4. The method of claim 1, wherein determining whether the first synchronization event has occurred comprises determining, by the second processor when the value is the second value, that the first synchronization event has occurred, and wherein the method further comprises resetting, by the second processor, the value to the first value.

5. The method of claim 1, further comprising:
    sending, by the first processor, to the second processor, and by invoking the API, a record task corresponding to the first synchronization event, indicating the first synchronization event has occurred, and comprising a second queue identifier and the synchronization register identifier, wherein the second queue identifier is of a queue in which the record task is located;
    receiving, by the second processor, the record task; and
    resetting, by the second processor, the value to the second value based on the synchronization register identifier.

6. The method of claim 1, further comprising:
    sending, by the first processor, to a third processor, and by invoking a third API, a record task corresponding to the first synchronization event, indicating the first synchronization event has occurred, and comprising a second queue identifier and the synchronization register identifier, wherein the second queue identifier is of a queue in which the record task is located;
    receiving, by the third processor, the record task; and
    resetting the value to the second value based on the synchronization register identifier.

7. The method of claim 1, wherein when the first synchronization event is an inter-process synchronization event, the method further comprises:
    setting, by the first processor, a name of the first synchronization object to a preset name by invoking a first application programming interface (API) of a first application; and
    obtaining, by the first processor, the synchronization register identifier by invoking a second API of a second application.

8. The method of claim 7, wherein the first synchronization event is between the first application and the second application, and wherein the preset name is agreed upon in advance by the first application and the second application.

9. The method of claim 1, further comprising:
    obtaining, by the first processor, a virtual address of a second synchronization register by invoking the API, wherein the second synchronization register corresponds to a second synchronization event, and wherein the second synchronization register indicates whether the second synchronization event has occurred; and sending, by the first processor and to a fourth processor, the virtual address.

10. The method of claim 1, further comprising invoking, by the first processor, an application programming interface (API) the API to release a correspondence between the first synchronization register and the first synchronization event and to reset the value to the first value.

11. The method of claim 1, wherein a physical address of the first synchronization register is based on a global addressing manner.

12. An apparatus comprising:
a first processor configured to:
create a first synchronization object for a first synchronization event, wherein the first synchronization object comprises a synchronization register identifier of a first synchronization register, and wherein a value of the first synchronization register comprises a first value indicating the first synchronization event has not occurred or a second value indicating the first synchronization event has occurred;
obtain a virtual address of a second synchronization register by invoking an application programming interface (API), wherein the second synchronization register corresponds to a second synchronization event, and wherein the second synchronization register indicates whether the second synchronization event has occurred; and
send, to a fourth processor, the virtual address; and
a second processor configured to determine, based on the value, whether the first synchronization event has occurred.

13. The apparatus of claim 12, wherein the first processor comprises a central processing unit (CPU).

14. The apparatus of claim 12, wherein the second processor comprises a neural processing unit (NPU).

15. The apparatus of claim 12, wherein the apparatus is a first artificial intelligence (AI) server, and wherein the fourth processor is in a second AI server.

16. The apparatus of claim 12, wherein the first processor is further configured to further create the first synchronization object by allocating the first synchronization register from among a plurality of synchronization registers in the second processor to the first synchronization event by invoking the API and storing the synchronization register identifier in the first synchronization object.

17. The apparatus of claim 12, wherein the first processor is further configured to send, to the second processor by invoking the API, a wait task that corresponds to the first synchronization event, is for waiting for the first synchronization event to occur, and comprises the synchronization register identifier and a first queue identifier of a queue in which the wait task is located, and wherein the second processor is further configured to receive, from the first processor, the wait task.

18. The apparatus of claim 12, wherein the second processor is further configured to:
further determine whether the first synchronization event has occurred by determining, when the value is the first value, that the first synchronization event has not occurred;
wait for the first synchronization event to occur; and
reset, when the first synchronization event occurs, the value to the first value.

19. The apparatus of claim 12, wherein the second processor is further configured to:
further determine whether the first synchronization event has occurred by determining, when the value is the second value, that the first synchronization event has occurred; and
reset the value to the first value.

20. The apparatus of claim 12, wherein the first processor is further configured to send, to the second processor by invoking the API, a record task corresponding to the first synchronization event, indicating the first synchronization event has occurred, and comprising a second queue identifier and the synchronization register identifier, wherein the second queue identifier is of a queue in which the record task is located, and wherein the second processor is further configured to:
receive the record task; and
reset the value to the second value based on the synchronization register identifier.

* * * * *

UNITED STATES PATENT AND TRADEMARK OFFICE
CERTIFICATE OF CORRECTION

| | | |
|---|---|---|
| PATENT NO. | : 12,073,261 B2 | |
| APPLICATION NO. | : 18/477117 | |
| DATED | : August 27, 2024 | |
| INVENTOR(S) | : Xiangyi Zhu and Hou Fun Lam | |

It is certified that error appears in the above-identified patent and that said Letters Patent is hereby corrected as shown below:

In the Claims

Claim 10, Column 41, Lines 8-9: "processor, an application programming interface (API) the API to release" should read "processor, the API to release"

Signed and Sealed this
First Day of October, 2024

Katherine Kelly Vidal
*Director of the United States Patent and Trademark Office*